(12) United States Patent
Kondo et al.

(10) Patent No.: US 9,257,718 B2
(45) Date of Patent: Feb. 9, 2016

(54) SECONDARY BATTERY

(71) Applicant: SEIKO EPSON CORPORATION, Tokyo (JP)

(72) Inventors: Shigeo Kondo, Hirakata (JP); Yasumasa Takeuchi, Kawasaki (JP)

(73) Assignee: SEIKO EPSON CORPORATION, Tokyo (JP)

( * ) Notice: Subject to any disclaimer, the term of this patent is extended or adjusted under 35 U.S.C. 154(b) by 94 days.

(21) Appl. No.: 14/265,982

(22) Filed: Apr. 30, 2014

(65) Prior Publication Data

US 2014/0234695 A1  Aug. 21, 2014

Related U.S. Application Data

(63) Continuation of application No. 11/896,067, filed on Aug. 29, 2007, now abandoned.

(30) Foreign Application Priority Data

Aug. 31, 2006  (JP) .................................. 2006-237062

(51) Int. Cl.
*H01M 10/0525* (2010.01)
*H01M 4/13* (2010.01)
(Continued)

(52) U.S. Cl.
CPC ............ *H01M 10/0525* (2013.01); *H01M 4/13* (2013.01); *H01M 10/052* (2013.01); *H01M 10/054* (2013.01); *H01M 10/0562* (2013.01); *H01M 10/0585* (2013.01); *H01M 10/28* (2013.01); *H01M 4/485* (2013.01); *H01M 4/54* (2013.01); *H01M 4/70* (2013.01);

(Continued)

(58) Field of Classification Search
CPC .......... H01M 10/0525; H01M 10/052; H01M 10/054; H01M 10/0562; H01M 10/0585; H01M 10/28; H01M 10/4235; H01M 2300/0065; H01M 4/13; H01M 4/485; H01M 4/54; H01M 4/70; Y02E 60/122; Y02E 60/124

See application file for complete search history.

(56) References Cited

U.S. PATENT DOCUMENTS 5,053,292 A  10/1991  Hasebe et al.
5,139,902 A   8/1992  Drews et al.
(Continued)

FOREIGN PATENT DOCUMENTS

JP  A-05-159803  6/1993
JP  A-8-203482   8/1996
(Continued)

OTHER PUBLICATIONS

Jones et al., "A thin-film solid-state microbattery", *Journal of Power Sources*, 43-44, pp. 505-513 (1993).
(Continued)

*Primary Examiner* — Raymond Alejandro
(74) *Attorney, Agent, or Firm* — Oliff PLC

(57) ABSTRACT

A secondary battery that can avoid reduction in battery capacity over the lapse of charge-discharge cycles and can exhibit high performance is provided. The secondary battery includes a laminated body having a pair of electrodes and an electrolyte layer provided between the pair of electrodes, the electrolyte layer including electrolyte particles, the laminated body having an end portion, and a restrictor provided so as to cover at least the end portion of the laminated body for restricting expansion of the electrolyte layer in the plane direction thereof.

15 Claims, 11 Drawing Sheets

(51) Int. Cl.
  *H01M 10/052* (2010.01)
  *H01M 10/054* (2010.01)
  *H01M 10/0562* (2010.01)
  *H01M 10/0585* (2010.01)
  *H01M 10/28* (2006.01)
  *H01M 4/485* (2010.01)
  *H01M 4/54* (2006.01)
  *H01M 4/70* (2006.01)
  *H01M 10/42* (2006.01)

(52) U.S. Cl.
  CPC .. *H01M 10/4235* (2013.01); *H01M 2300/0065* (2013.01); *Y02E 60/122* (2013.01); *Y02E 60/124* (2013.01)

(56) References Cited

U.S. PATENT DOCUMENTS

| | | | |
|---|---|---|---|
| 6,458,483 | B1 | 10/2002 | Hamano et al. |
| 2002/0068221 | A1 | 6/2002 | Watanabe et al. |
| 2003/0118897 | A1 | 6/2003 | Mino et al. |
| 2003/0198871 | A1* | 10/2003 | Sekino ............. H01M 10/0569 429/331 |
| 2003/0228471 | A1 | 12/2003 | Hayakawa et al. |
| 2004/0121195 | A1 | 6/2004 | Ghantous et al. |
| 2004/0258988 | A1 | 12/2004 | Nielsen et al. |
| 2006/0099504 | A1* | 5/2006 | Kim ................. H01M 2/0275 429/176 |
| 2007/0054183 | A1* | 3/2007 | Kim ................. H01M 2/14 429/144 |

FOREIGN PATENT DOCUMENTS

| | | |
|---|---|---|
| JP | A-10-106627 | 4/1998 |
| JP | A-10-247480 | 9/1998 |
| JP | A-11-040198 | 2/1999 |
| JP | A-2000-106154 | 4/2000 |
| JP | A-2000-133220 | 5/2000 |
| JP | A-2001-068149 | 3/2001 |
| JP | A-2006-351326 | 12/2006 |

OTHER PUBLICATIONS

Iwamoto et al., "Solid State Lithium Battery with $Li_2FeS_2$ as Anode Material", *Denki Kagaku*, vol. 66, No. 9, pp. 935-938 (1998).

Aotani et al., "Synthesis and electrochemical properties of lithium ion conductive glass, $Li_3PO_4$—$Li_2S$—$SiS_2$", *Solid State Ionics*, vol. 68, pp. 35-39 (1994).

\* cited by examiner

SECONDARY BATTERY

CROSS-REFERENCE TO RELATED APPLICATION

This application is a continuation application of U.S. patent application Ser. No. 11/896,067, filed on Aug. 29, 2007, which claims priority to Japanese Patent Application No. 2006-237062 filed on Aug. 31, 2006, which is hereby expressly incorporated by reference herein in its entirety.

BACKGROUND

1. Technical Field

The present invention relates to a secondary battery and, more particularly, a secondary battery whose electrolyte layer is mainly composed of electrolyte particles.

2. Related Art

Along with development of portable equipments such as a personal computer and a cellular phone, demand for a small-sized lightweight battery as a power source of the portable equipments shows a drastic increase in recent years.

In particular, it is predicted that a lithium battery realizes a high energy density since lithium has a reduced atomic weight and increased ionization energy. Extensive research has been made in this respect, as a result of which the lithium battery is widely used as a power source of the portable equipments these days.

Expansion of a lithium battery market demands a lithium battery having a higher energy density. In order to comply with such a demand, internal energy of the lithium battery has been made greater by increasing the quantity of an active material contained in the battery.

Concomitant with this trend, a noticeable increase has been made in the quantity of organic solvent contained in an electrolyte (electrolytic solution) which is a flammable material filled in the battery. This results in an increased danger of battery firing and, therefore, the problem of battery safety becomes at issue in recent years.

One of highly effective methods for assuring the safety of a lithium battery is to replace the electrolyte containing the organic solvent with a nonflammable solid electrolyte. Among others, use of a lithium-ion-conducting inorganic solid electrolyte makes it possible to develop an all-solid lithium battery that exhibits improved safety. Active research is now being made in this connection.

As an example, S. D. Jhones and J. R. Akridge, J. Power Sources, 43-44, 505 (1993) discloses an all-solid thin film lithium secondary battery produced by sequentially forming a cathode thin film, an electrolyte thin film and an anode thin film through the use of a deposition apparatus or a sputtering apparatus. It was reported that the thin film lithium secondary battery exhibits superior charge-discharge cycle characteristics of several thousand cycles or more.

With this thin film lithium secondary battery, however, it is impossible for a battery element to retain an electrode active material in a large quantity, thereby making it difficult to obtain a high capacity battery. In order to increase the battery capacity, a great quantity of electrode active materials should be contained in an electrode, for the purpose of which there is a need to construct a bulk type battery.

The bulk type battery is typically manufactured by compression-molding the entire battery element within a mold of a press machine, taking out the battery element from the mold and placing the battery element into a coin type (R621) battery container. However, in the case of the bulk type battery, particularly, an all-solid lithium secondary battery using a sulfide-based lithium-ion-conducting solid electrolyte, it is known that the capacity thereof is reduced by about 7% from its initial capacity when subjected to several cycles of charge-discharge operations at most (see, e.g., DENKI KAGAKU, 66, No. 9 (1998)).

Thus, there is currently a demand for development of a secondary battery (bulk type all-solid secondary battery) having improved performance and being capable of preventing reduction of a battery capacity over the lapse of charge-discharge cycles.

SUMMARY

Accordingly, it is an object of the present invention to provide a secondary battery that can avoid reduction in battery capacity over the lapse of charge-discharge cycles and can exhibit high performance.

An aspect of the invention is directed to a secondary battery. The secondary battery comprises a laminated body having a pair of electrodes and an electrolyte layer provided between the pair of electrodes, the electrolyte layer including electrolyte particles, the laminated body having an end portion, and a restrictor provided so as to cover at least the end portion of the laminated body for restricting expansion of the electrolyte layer in the plane direction thereof.

According to the above secondary battery, use of the restrictor makes it possible to restrict expansion of the electrodes in the plane direction thereof and the resultant expansion of the electrolyte layer in the plane direction thereof during the charge-discharge operations.

Therefore, it is possible to avoid formation or generation of gaps (spaces) between particles (or grains) of constituent materials of the electrodes or between the electrodes and the electrolyte layer, and deposition of metal contained in the electrode materials or electrolyte material into the gaps.

As a result, it is possible to prevent breakage of an electronic bond in the electrodes, or disconnection of an ion-conducting path in the electrodes, between the electrodes and the electrolyte layer or in the electrolyte layer during the charge-discharge operations.

This makes it possible to provide a secondary battery that can avoid reduction in battery capacity over the lapse of charge-discharge cycles and can exhibit high performance.

In the above secondary battery, it is preferred that the laminated body has conductive portions respectively connected to the respective electrodes, and the restrictor is provided so as to cover almost all of the laminated body excepting the conductive portions.

This makes it possible to exhibit noticeably the function of restricting the expansion of the electrolyte layer and the electrodes (electrode layers) in the plane direction thereof but not in the thickness direction thereof. Further, by doing so, it is also possible to secure the mechanical strength of the secondary battery as a whole and to allow the restrictor to serve as a protection layer for the laminated body.

In the above secondary battery, it is preferred that the restrictor is comprised of a plurality of layers respectively formed of different materials.

Use of the restrictor of this configuration also makes it possible to restrict effectively and reliably the expansion of the electrolyte layer and the electrodes (electrode layers) in the plane direction thereof but not in the thickness direction thereof.

In the above secondary battery, it is preferred that the restrictor is made of an insulating material.

This makes it possible to prevent short-circuit between the cathode and the anode reliably.

In the above secondary battery, it is preferred that the insulating material is any one of thermoplastic resin, thermosetting resin, photocurable resin and low-melting-point glass or a combination of two or more of them.

Use of these materials allows the restrictor to be formed with ease. Furthermore, use of these materials helps to increase the mechanical strength of the restrictor.

In the above secondary battery, it is preferred that at least one of the pair of electrodes has a base member having a plurality of filling portions, and at least the filling portions of the base member is filled with an electrode material.

Use of the electrode of this configuration also makes it possible to restrict effectively and reliably the expansion of the electrode (electrode layer) in the plane direction thereof but not in the thickness direction thereof.

In the above secondary battery, it is preferred that the base member is provided for preventing or suppressing expansion of the electrode in the plane direction thereof.

For example, the laminated body is produced by performing a press operation in a state that the electrolyte particles constituting the electrolyte layer are interposed between the cathode and the anode. This makes it possible to prevent occurrence of elongation (deformation) in the electrode when producing the laminated body.

Further, even in the case where the expansion and contraction of crystals of the electrode material (electrode active material) occurs when the secondary battery is in use (charge-discharge operation), it is possible to suppress or prevent the elongation (deformation) in the electrode.

As a result, it becomes possible to prevent or suppress formation or generation of gaps (spaces) between the electrolyte particles contained in the electrolyte layer, or separation of the electrode (electrode layer) and the electrolyte layer. Furthermore, it becomes also possible to increase the mechanical strength of the secondary battery as a whole.

In the above secondary battery, it is preferred that the base member has a surface thereof, and at least the surface has conductivity for making the current density in the electrode uniform.

This makes it possible to make the current density in the electrode uniform when the secondary battery is charged and discharged. This suppresses or prevents emergence of a region where the electric current flows locally and, consequently, it is possible to prevent local expansion or contraction of the electrode material (electrode active material) in that region.

As a result, it is possible to suppress or prevent the above-mentioned breakage of the electronic bond or disconnection of the ion-conducting path in the electrode (at least one of the cathode and the anode), formation or generation of a space between the electrolyte particles contained in the electrolyte layer, or separation of the electrode (electrode layer) and the electrolyte layer. Therefore, it is also possible to suitably suppress or prevent degradation of charge-discharge characteristics of the secondary battery.

In the above secondary battery, it is preferred that the base member includes a mesh member having through-holes which serve as the filling portions.

This makes it possible to suppress or prevent the expansion and contraction (deformation) of the electrode when the secondary battery is in use (charge-discharge operation). As a result, it is possible to suppress or prevent the formation or generation of the gaps between the electrolyte particles contained in the electrolyte layer, or the separation of the electrode (electrode layer) and the electrolyte layer. Further, it becomes also possible to increase the mechanical strength of the secondary battery as a whole.

In the above secondary battery, it is preferred that the mesh member has an outer circumferential portion, and the base member further includes a reinforcing portion which extends along the outer circumferential portion of the mesh member for reinforcing the mesh member.

This makes it possible to reliably prevent deformation (expansion, bending, flexion or the like) of the base member. Accordingly, in the case where a function of preventing expansion of the electrode is given to the base member, the function is performed in a more reliable manner.

In the above secondary battery, it is preferred that the base member further includes a reinforcing plate which is provided on the opposite side of the mesh member from the electrolyte layer for reinforcing the mesh member.

This also makes it possible to reliably prevent deformation (expansion, bending, flexion or the like) of the base member. Accordingly, in the case where a function of preventing expansion of the electrode is given to the base member, the function is performed in a more reliable manner.

In the above secondary battery, it is preferred that the at least one of the pair of electrodes has an electrode material layer made of the electrode material, and the electrode material layer lies on the side of the electrolyte layer so as to have an average thickness of 120 µm or less when viewed from the side thereof.

This makes it possible to increase the effect of the base member provided in the electrode more conspicuously.

In the above secondary battery, it is preferred that the electrode material contains an electrode active material and a solid electrolyte material.

This makes it possible to increase adhesion between the electrode and the electrolyte layer. This ensures that ions are smoothly transferred between the electrode and the electrolyte layer, which makes it possible to improve the characteristics (charge-discharge characteristics) of the secondary battery.

In the above secondary battery, it is preferred that the electrolyte particles are composed of a silver ion conductor or a lithium ion conductor.

Although the invention can be applied to various kinds of secondary batteries, it is preferred that the invention is applied to a lithium-ion-conducting secondary battery or a silver-ion-conducting secondary battery.

In the above secondary battery, it is preferred that the lithium ion conductor is a sulfide-based lithium ion conductor.

This makes it possible to improve the characteristics of the lithium-ion-conducting secondary battery.

In the above secondary battery, it is preferred that the lithium ion conductor contains at least one of a crystalline lithium ion conductor and an amorphous lithium ion conductor.

Use of the crystalline lithium ion conductor (e.g., thio-LISICON) provides an advantage that the output current of the manufactured secondary battery can be kept high. Further, use of the amorphous lithium ion conductor provides an advantage that the permissible temperature range can be kept broad when manufacturing and using the secondary battery.

Furthermore, use of the crystalline lithium ion conductor and the amorphous lithium ion conductor in combination, it becomes possible to enjoy a synergistic effect offered by them.

DESCRIPTION OF EXEMPLARY EMBODIMENTS

The present inventor has conducted the following study in an effort to clarify the cause of capacity reduction of a secondary battery that occurs along with the lapse of charge-discharge cycles.

First, a silver-ion-conducting all-solid secondary battery was prepared by using a silver ion conductor ($Ag_6I_4WO_4$) as a solid electrolyte, using δ-type silver vanadate (δ-$Ag_{0.7}V_2O_5$) as a cathode active material and using metallic silver (Ag) as an anode active material. Then, a study was made on the distribution of an electric current flowing in the battery at the time of charging and discharging the latter.

The silver-ion-conducting all-solid secondary battery was manufactured in the following manner.

Step I: An electrode mixture (electrode material) was first prepared by mixing 5-$Ag_{0.7}V_2O_5$ (cathode active material) and $Ag_6I_4WO_4$ (solid electrolyte) in a weight ratio of 5:5.

Figure 14:
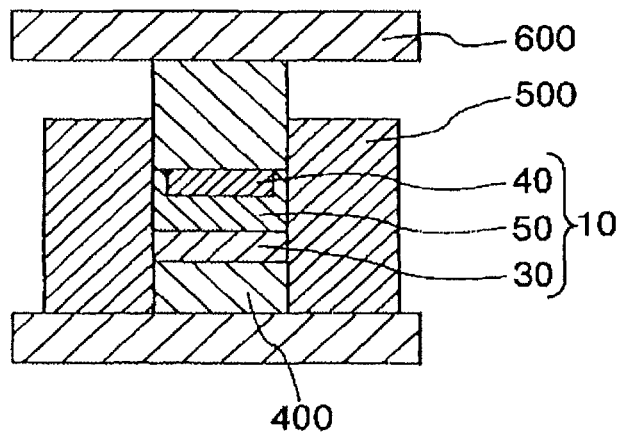
FIG. 14 is a vertical section view showing a mold for producing a battery element.

Step II: Next, as shown in FIG. 14, 65 mg of the electrode mixture was filled in a cylindrical hole of 1 cm in diameter of a female mold 500 in a state that a lower male mold 400 was inserted into the cylindrical hole of the female mold 500.

Step III: Next, an upper male mold 600 was inserted into the cylindrical hole of the female mold 500, and then the electrode mixture was preliminarily pressure-molded into a disc-shaped cathode 30 at a pressure of 0.5 ton/cm². Thereafter, the upper male mold 600 was removed from the female mold 500.

Step IV: Next, 100 mg of solid electrolyte powder (particles) was filled in the cylindrical hole without having to remove the cathode 30. And then, the upper male mold 600 was inserted into the cylindrical hole again and the solid electrolyte powder was pressed, whereby the cathode 30 was integrally molded with a disc-shaped electrolyte layer 50. Thereafter, the upper male mold 600 was removed from the female mold 500.

Figure 15:
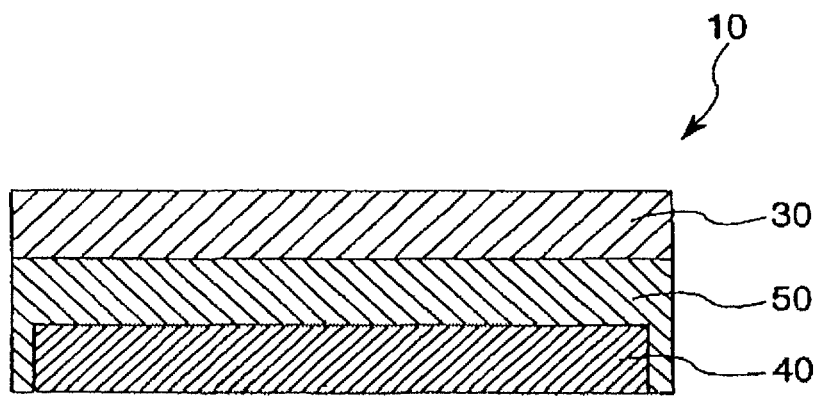
FIG. 15 is a vertical section view showing a configuration of the battery element.

Step V: Next, a disc-shaped metallic silver plate having a thickness of 100 μm and a diameter of 0.95 cm was inserted into the cylindrical hole as an anode 40. And then, the upper male mold 600 was inserted into the cylindrical hole again and pressure-molding was performed at a final pressure of 4 tons/cm², thereby producing a battery element (laminated body) 10 in which the electrolyte layer 50 was interposed between the cathode 30 and the anode 40, as illustrated in FIG. 15.

Alternatively, the battery element (laminated body) 10 may be produced by independently pressure-molding the cathode 30, the anode 40 and the electrolyte layer 50 in advance, placing them one above another, and pressing them into an integral body.

Step VI: The battery element 10 was received in a coin type battery container 70 having a structure shown in FIG. 16. Thereafter, the battery element 10 was covered with a sealing plate 90 in a state that a packing 80 was interposed between the coin type battery container 70 and the sealing plate 90, and the battery container 70 was sealed off by pressing the sealing plate 90 against the battery container 70 through the use of a press machine.

Figure 16:
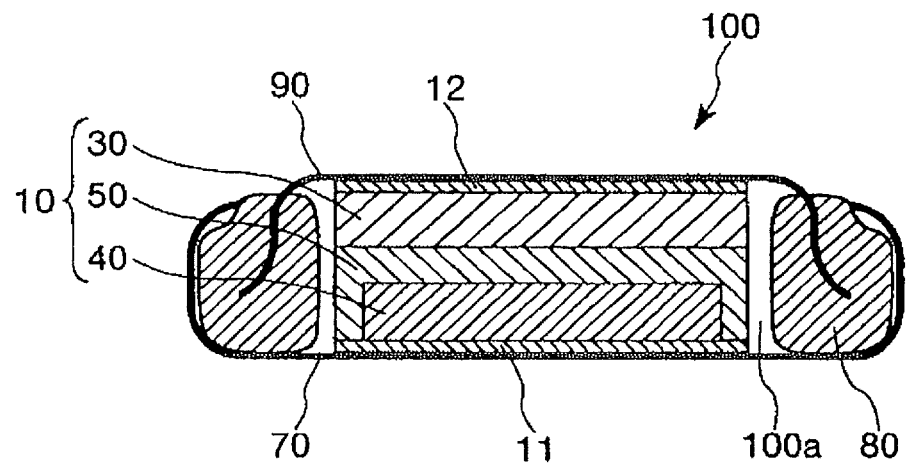
FIG. 16 is a vertical section view showing a configuration of a coin type secondary battery.

In this way, a silver-ion-conducting all-solid secondary battery 100 was obtained in which a gap 100a was left around the battery element 10 within the battery container 70 (lest the periphery (surface) of the battery element 10 should be pressured strongly). In FIG. 16, reference numeral 11 designates a copper-made anode collector and reference numeral 12 designates a copper-made cathode collector.

If the secondary battery 100 is charged, silver that constitutes the cathode active material of the cathode 30 is turned to silver ions which in turn are separated from the cathode 30 and moved into the electrolyte layer 50. Subsequently, the thus separated silver ions move toward a silver plate interface of the anode 40 where the silver ions are electrically reduced and deposited as metallic silver. A discharge reaction proceeds in the opposite order.

The secondary battery 100 was charged and discharged with a constant current density of 0.1 mA/cm², a final charge voltage of 0.55 V at 50 μA and a final discharge voltage of 0.2 V. The results were that the secondary battery 100 could not be charged and discharged from the lapse of about ten cycles, during which time the battery capacity tended to be decreased each time the charge-discharge cycles were repeated.

Figure 17:
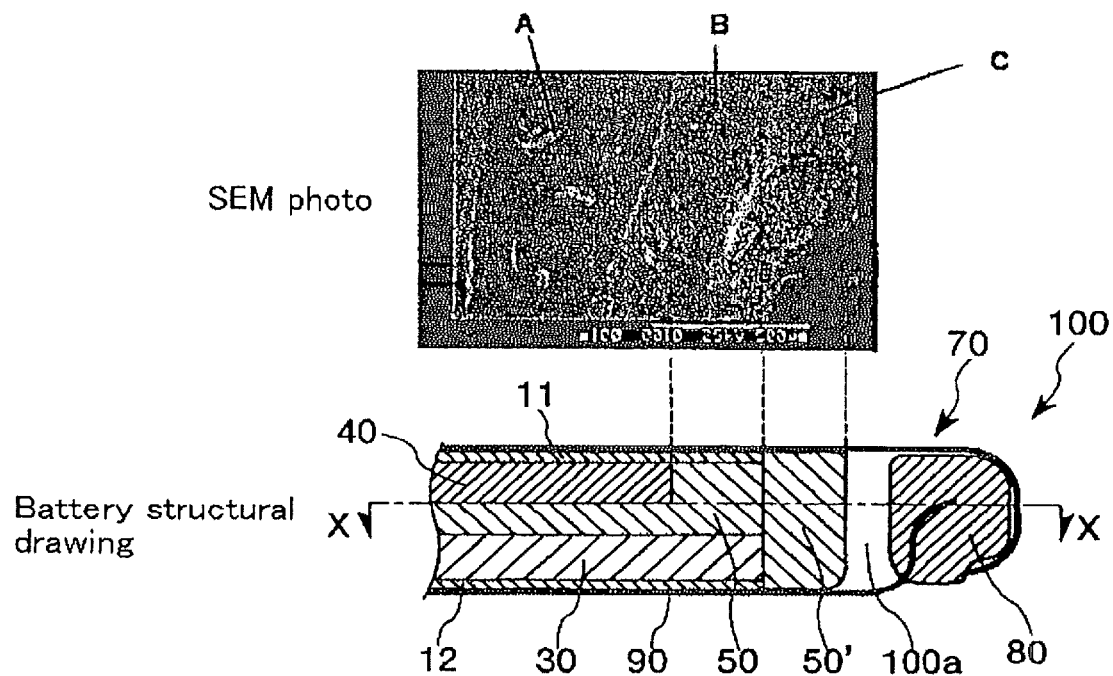
FIG. 17 is a contrast view which contrasts a scanning electron microscope (SEM) photo of a cross section taken along line X-X in FIG. 17 to a vertical section view showing a configuration of the secondary battery.

Next, the secondary battery 100 that has shown capacity reduction and lost its ability to charge and discharge electricity was disassembled to examine the cross section taken along line X-X in FIG. 17 by use of a scanning electron microscope (hereinafter referred to as "SEM"). A photo taken by the SEM is illustrated in FIG. 17, which has a vertical section view of the secondary battery 100 showing the portions corresponding to the SEM photo.

As is apparent from the SEM photo, branch-like metallic silver was deposited in the outer periphery portion (a "C"-portion of the SEM photo) of the electrolyte layer 50 surrounding the circumference of the anode 40, whereas block-like metallic silver was deposited in the electrolyte layer 50 (a "B"-portion of the SEM photo) with which the corner portion of the anode 40 makes contact.

In contrast, no metallic silver deposition was observed in a bonding interface (an "A"-portion of the SEM photo) between the major surface (lower surface) of the anode 40 and the electrolyte layer 50.

In this secondary battery 100, the battery element 10 received within the battery container 70 is sealed off in a state that the packing 80 is interposed between the battery container 70 and the sealing plate 90. During the sealing process, the cathode 30 and the electrolyte layer 50 of the battery element 10 are compressed in the thickness direction thereof and protrude or expand slightly (about 200 µm) toward a gap 100a within the battery container 70, thereby forming a protrusion 50'.

It is found that the branch-like metallic silver is deposited in the protrusion 50', i.e., in the non-compressed portion (the "C"-portion of the SEM photo), and further that the block-like metallic silver is deposited in the lightly compressed portion (the "B"-portion of the SEM photo) of the electrolyte layer 50 at the time of sealing the secondary battery 100. Furthermore, it is turned out that no metallic silver is deposited in the strongly compressed portion of the secondary battery 100 (the "A"-portion of the SEM photo).

The deposition of the branch-like metallic silver or the block-like metallic silver in the electrolyte layer 50 which makes contact with the peripheral portion of the electrode (anode 40) of the battery element 10 means that a quite intensive electric current flows in the peripheral portion when charging the battery.

In other words, when charging the battery, due to the intensive flow of the electric current in the peripheral portion of the electrode, the electrode expands in that portion. This creates gaps (spaces) between the electrode and the electrolyte layer in that portion or gaps between the bonded particles of the electrolyte (hereinafter, these particles of the electrolyte will be referred to as "electrolyte particles") in the electrolyte layer 50 which makes contact with that portion. And the metallic silver is deposited into the gaps.

The deposited metallic silver forms grain boundaries between the electrolyte particles. As a result, this grain boundaries prevent a contact between the electrolyte particles to thereby break the ion-conducting path between the electrolyte particles in the electrolyte layer 50.

Furthermore, the movement of ions in the case of using powdery or granular solid electrolyte (electrolyte particles) is heavily affected by the interface bonding state of electrolyte particles (see N. Aotani, K. Iwamoto, K. Takada and S. Kondo, Solid State Ionics [68 (1994) 35-38]).

In this paper, a change in ion conductivity relative to a molding pressure is measured at the time of making an electrolyte layer from a sulfide-based amorphous lithium ion conductor (electrolyte particles) of different particle sizes. This measurement shows that, if the molding pressure is equal to or greater than 5 tons/cm$^2$, the ion conductivity becomes constant.

It is also reported that, under this state, the ion movement between the electrolyte particles contained in the electrolyte layer is made primarily by bulk conduction instead of grain boundary conduction, thereby eliminating the grain boundary problem which occurs between the electrolyte particles.

Considering this fact together with the test results for the secondary battery 100 made of a silver-ion-conducting solid electrolyte, it can be seen that, during the charge-discharge operations, an electric current flows intensely in the peripheral portion of the electrodes (cathode 30 and anode 40) constituting the battery element 10 at an initial stage.

Expansion and contraction of the volume of electrode active materials become conspicuous in that portion. As a result, an electronic bond between particles (or grains) of the electrode active material or an ion conducting path between the electrode active material and the electrolyte is destroyed mainly in the peripheral portion of the electrode where the interior of the electrode is bonded with a weak mechanical force.

At this time, adhesion between the electrodes and the electrolyte layer is decreased so that gaps (spaces) between them are formed in that portion. As a result, an ion conducting path between the electrodes and the electrolyte layer is also destroyed.

In this regard, the phenomenon that the electric current converges on the peripheral portion of the electrode occurs usually in an electrochemical element, which is referred to as an "edge effect". This phenomenon also appears in the case of using a liquid electrolyte or a polymer electrolyte.

However, since the liquid electrolyte exists in a liquid phase or the polymer electrolyte includes an electrolytic solution, even in the case where the volume of the electrode active material expands and contracts, the liquid electrolyte and the polymer electrolyte can make contact with the electrodes reliably. Therefore, there is no possibility that the ion-conducting path is cut off when the liquid electrolyte and the polymer electrolyte are used.

Accordingly, it is inferred that the above-noted phenomenon is common to the solid electrolyte secondary battery made of a silver ion conductor and the secondary battery (all-solid secondary battery) employing other kinds of powdery solid electrolyte.

As an example, in the case of an all-solid lithium secondary battery, it is predicted that the electric current flowing during a charge-discharge reaction has a tendency to grow intensive mainly in the peripheral portion of an electrode within the battery.

Based on these facts, it is inferred that the following is the cause of battery capacity reduction over the lapse of charge-discharge cycles in the secondary battery.

First, when charging the battery, the flow of an electric current is concentrated on the peripheral portion of electrodes within the battery. Thus, the volume of an electrode active material, especially an anode active material, is heavily expanded in that portion, whereas a cathode active material undergoes contraction in volume.

Consequently, in the cathode 30 the ion conducting path formed between the electrode active material and the solid electrolyte is disconnected and the electronic bond between the particles of the cathode active material is broken, whereas in the anode 40 the electronic bond between grains of the anode active material is broken.

This weakens the bond (interface bond) between the electrodes (cathode 30 and anode 40) and the electrolyte layer or the bond between electrolyte particles contained in the electrolyte layer 50 that makes contact with the peripheral portion, thereby breaking the bond. Further, metallic silver contained in the electrode active materials or the electrolyte material is deposited between the electrodes and the electrolyte layer 50 or between the electrolyte particles.

The weakening of the bond or the deposition of the metallic silver causes a partial breakage in the ion conducting path between the electrodes and the electrolyte layer 50 or between the electrolyte particles in the electrolyte layer 50. Furthermore, due to the expansion and contraction of the volume of the electrode active materials, an electronic bond between the electrodes and conductive substrates (anode collector 11 and cathode collector 12) may also be destroyed.

This phenomenon grows noticeably in proportion to the intensity of a charging current. It is predicted that the disconnection or the breakage of the electronic bond or the ion conducting path depends on the current supply time, namely the current supply quantity.

Further, in the case where the charge-discharge cycles are repeated, when the battery is charged, the disconnection or the breakage of the electronic bond or the ion conducting path progresses, for a little while, from the peripheral portion side of each electrode (outside the battery element 10) to the central portion side thereof (inside the battery element 10).

On the other hand, when the battery is discharged, only the electrode active material in the portion where the electronic bond remains intact can play a role in the discharge operation. This leads to reduction in discharge capacity as compared to the charge capacity.

Further, during the discharging process, the volume of the anode active material contracts, whereas the volume of the cathode active expands unlike during the charging process. As a result, during the discharging process, the electronic bond and ion conducting path are also broken or disconnected in the same manner as during the charging process.

In the case of recharging this battery, the charge quantity of electricity becomes equal to the electricity quantity corresponding to the discharge capacity from which the electric capacity used in breaking the electronic bond and disconnecting the ion-conducting path during the charging process mainly at the side of the anode 40 is deducted. At this time, the electricity is recharged while breaking the electronic bond or disconnecting the ion-conducting path once again.

Further, in the case where the battery is discharged again, only the electrode active material in the portion where the electronic bond or the ion-conducting path remains intact can play a role in the discharge operation. This means that the discharge capacity is further reduced as compared to the charge capacity.

In other words, at least one of the electronic bond and the ion-conducting path of the battery is broken or disconnected each time the battery undergoes the charge-discharge operations. In accordance with this, the discharge capacity is reduced for a little while.

In view of the foregoing study, the present inventor has reached a conclusion that, for avoidance of reduction in battery capacity caused by the lapse of charge-discharge cycles, it is important to maintain the state of electrodes (electrode layers) and an electrolyte layer and the bonding state between the electrodes and the electrolyte layer so as to be close to an initial state. Based on this conclusion, the present inventor has completed the invention.

The task of maintaining the state and the bonding state so as to be close to the initial state can be accomplished by restricting expansion of an all-solid secondary battery (battery element) in the plane direction thereof but not in the thickness direction thereof.

Further, the above task can be accomplished by eventually preventing any breakage of the electronic bond and any disconnection of the ion-conducting path in the peripheral portion of the electrodes, any disconnection of the ion-conducting path between the electrodes and the electrolyte layer, and any disconnection of the ion-conducting path between electrolyte particles in the peripheral portion of the electrolyte layer 5.

A secondary battery in accordance with the invention includes a laminated body and a restrictor provided so as to cover at least an end portion of the laminated body, the laminated body having a pair of electrodes and an electrolyte layer provided between the pair of electrodes, wherein the electrolyte layer is composed of (includes) electrolyte particles.

The restrictor has a function of mainly restricting expansion of the electrolyte layer in the plane direction thereof but not in the thickness direction thereof. The secondary battery can avoid reduction in battery capacity over the lapse of charge-discharge cycles and can exhibit high performance.

In this regard, it is presumed that the expansion of the electrolyte layer in the plane direction thereof occurs during a pressing step of a secondary battery manufacturing process or by the expansion of the electrodes (expansion of crystals of electrode active materials) when in use.

Hereinafter, the secondary battery (all-solid secondary battery) in accordance with the invention will be described in detail with reference to preferred embodiments shown in the drawings.

In the following embodiments, a silver-ion-conducting secondary battery will be representatively set forth as an example of the secondary battery (all-solid secondary battery) in accordance with the invention.

First Embodiment

First, description will be made on a first embodiment of the secondary battery.

Figure 1:
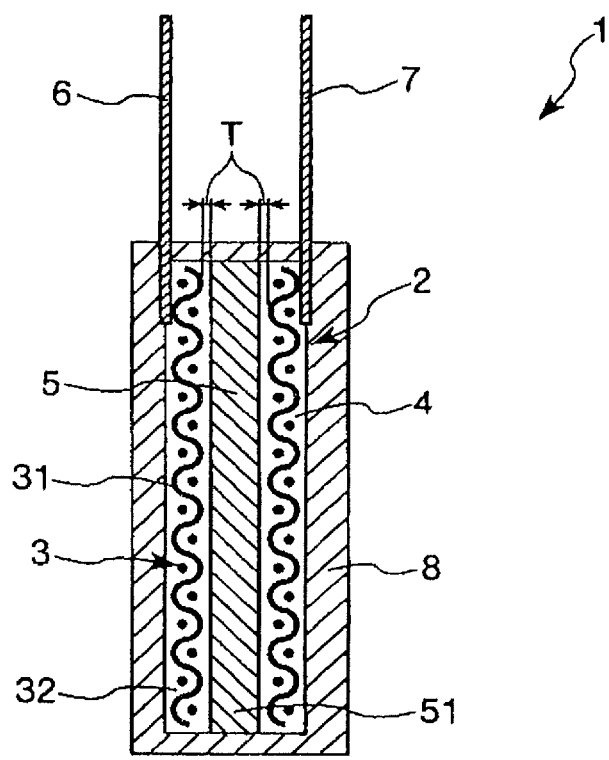
FIG. 1 is a vertical section view showing a secondary battery in accordance with a first embodiment of the invention.

FIG. 1 is a vertical section view showing a secondary battery in accordance with a first embodiment of the invention. FIG. 2A to FIG. 2D are respectively configuration examples of an electrode of the secondary battery.

In the following description, the upper side in FIGS. 1 and 2 will be referred to as "top" or "upper" and the lower side will be referred to as "bottom" or "lower", only for the sake of better understanding. Further, it is assumed that an electrolyte layer lies below each of the electrodes in FIG. 2A to FIG. 2D.

Referring to FIG. 1, the secondary battery (secondary battery with a restrictor) 1 includes a laminated body (battery element) 2, a cathode lead 6, an anode lead 7 and a restrictor 8 provided so as to cover substantially the entirety (entire circumference) of the laminated body 2, wherein the laminated body 2 is provided with a cathode 3 and an anode 4 (i.e., a pair of electrodes) as well as an electrolyte layer 5 provided between the cathode 3 and the anode 4.

First, description will be given on the cathode 3 and the anode 4. Seeing that the cathode 3 and the anode 4 have the same configuration in the present embodiment, the cathode 3 will be described as a representative.

Figure 2A:
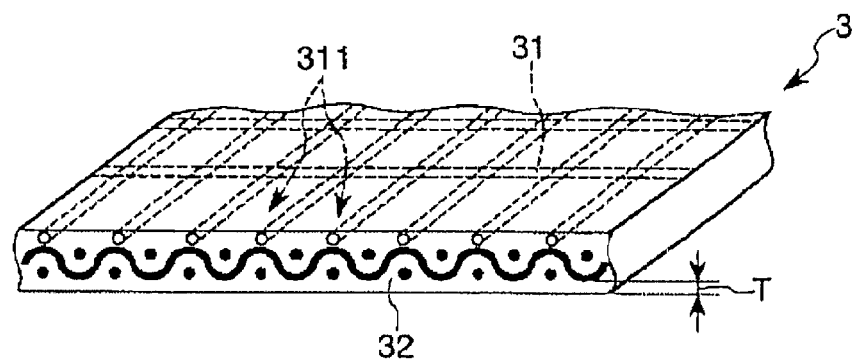
FIG. 2A to FIG. 2D are respectively configuration examples of an electrode of the secondary battery.

As illustrated in FIG. 2A, the cathode 3 is comprised of a mesh member (base member) 31, which has a plurality of through-holes 311 which serve as filling portions, and an electrode material 32 filled in at least the through-holes 311 of the mesh member 31. When seen in a plan view, the mesh member 31 has a contour and size nearly equal to or smaller than that of the electrolyte layer 5.

The mesh member 31 is provided for realizing: i) a function of preventing or suppressing expansion of the electrode (cathode 3) in the plane direction thereof; and ii) a function of making the current density in the cathode 3 (electrode) uniform by providing conductivity to at least the surface of the mesh member 31. The mesh member 31 may be provided so as to play other functions.

In the case of the function i), the laminated body 2 is produced by performing a press operation in a state that the electrolyte particles 51 constituting the electrolyte layer 5 are interposed between the cathode 3 and the anode 4. This makes it possible to suppress or prevent occurrence of elongation (deformation) in the cathode 3 (electrode) when producing the laminated body 2.

This ensures that the electrolyte layer 5 provided between the cathode 3 and the anode 4 in a contacting relationship therewith can also be formed with no likelihood of deformation. It becomes also possible to increase the mechanical strength of the secondary battery 1 as a whole.

Furthermore, in the case of the function i), it is possible for the mesh member 31 to restrict expansion of the electrode material 32 filled in the respective through-holes 311, which would otherwise occur by the expansion and contraction of crystals of the electrode material 32 when the secondary battery 1 is in use (charge-discharge operation).

This makes it possible to reduce the expansion of the cathode 3 (electrode) as a whole. Therefore, in the interface between the cathode 3 and the electrolyte layer 5, it is possible to suitably suppress or prevent an increase in contact resistance which would be caused by disconnection (disjunction) of the cathode 3 and the electrolyte layer 5.

In the case of the function ii), the current density in the cathode 3 (electrode) becomes uniform when the secondary battery 1 is charged and discharged. This suppresses or prevents emergence of a region where the electric current flows locally (e.g., the electric current flows preferentially around a portion of cathode 3 to which the cathode lead 6 is connected) and, consequently, local expansion or contraction of an electrode active material in that region.

In this regard, attention is drawn to the fact that the deposition and dissolution phenomenon of, e.g., a metal (silver), is accompanied by a severe change in volume. Therefore, it is possible to suitably suppress or prevent degradation of charge-discharge characteristics of the secondary battery 1.

Furthermore, in the case of the function i), examples of a constituent material that can be used as the mesh member 31 include: electron-conducting metallic materials such as copper (Cu), nickel (Ni), titanium (Ti) and stainless steel (SUS); and insulating materials inclusive of a hard resin material such as polycarbonate and ceramics such as alumina and glass.

In the case of the function ii), examples of the mesh member 31 include a member having conductivity at least on its surface, such as a member made of a conductive material in its entirety or a member having a core whose surface is coated with a conductive layer.

Examples of a method for forming the conductive layer include a gas phase coating method such as vapor deposition or sputtering and a liquid phase coating method such as electrolytic plating or non-electrolytic plating, one or more of which may be used independently or in combination.

In this regard, it is to be noted that in order to endow the mesh member 31 with both of the function i) and the function ii), it is desirable to use a member made of a conductive material in its entirety (e.g., an expanded metal mesh).

The occupation percentage of the through-holes 311 of the mesh member 31 in a plan view is preferably about 25 to 90% and more preferably about 50 to 85%, although it may slightly vary depending on the constituent material and intended use of the mesh member 31.

Furthermore, the mesh member 31 has an average thickness of preferably about 50 to 400 μm and more preferably about 100 to 200 μm, although the average thickness may be slightly changed depending on the constituent material and intended use of the mesh member 31.

In the present embodiment, the electrode material 32 is applied to the mesh member 31 in such a manner that it can fill the through-holes 311 of the mesh member 31 and also can cover substantially the whole surface of the mesh member 31.

As the electrode material 32, an electrode active material or a mixture of an electrode active material and a solid electrolyte material (an electrode mixture material) may be used.

By using the mixture of the electrode active material and the solid electrolyte material as the electrode material 32, it becomes possible to increase the ion-conducting bonding interface between particles of the electrode active material and the electrolyte particles which constitute the cathode 3 (electrode), and also to increase the interface bonding force (adhesion) between the cathode 3 and the electrolyte layer 5.

This ensures that ions are smoothly transferred between the electrodes and the electrolyte layer 5, which makes it possible to improve the characteristics (charge-discharge characteristics) of the secondary battery 1.

Examples of the electrode active material include δ-type silver vanadate ($\delta$-$Ag_{0.7}V_2O_5$), metallic silver (Ag) and silver chromate ($Ag_2Cr_2O_4$), one or more of which may be used independently or in combination. Among them, it is desirable to use δ-type silver vanadate (particularly, $\delta$-$Ag_{0.7}V_2O_5$) as the electrode active material.

Use of this compound makes it possible to improve the characteristics of the cathode 3 and the anode 4 and, eventually, to enhance the characteristics (charge-discharge characteristics) of the secondary battery 1. Moreover, δ-type silver vanadate is less environmentally detrimental, more stable in the air and easier to handle than silver chromate.

In the case of using the mixture of the electrode active material and the solid electrolyte material, the solid electrolyte material may either be the same kind as (identical to) or differ from the constituent material of the electrolyte layer 5 (electrolyte material) set forth below.

However, it is preferred that the solid electrolyte material is the same kind as (especially, identical to) the constituent material of the electrolyte layer 5. This assures smooth transfer of metal ions (silver ions) between the cathode (electrode) and the electrolyte layer 5 and also helps to improve adhesion between them.

In this case, the mixing ratio of the electrode active material (conductive material) and the solid electrolyte material is preferably about 2:8 to 9:1 by weight and more preferably about 4:6 to 8:2 by weight, although the mixing ratio is not particularly limited thereto.

As the electrode material 32, it is desirable to use a granular (powdery) material having a particle size of 20 micron or less. Use of such a granular electrode material 32 makes it possible to fill the electrode material 32 in the through-holes 311 of the mesh member 31 in an easy and reliable manner.

In a side view, the cathode 3 has a portion where the electrode material 32 does not overlap the mesh member 31 at the side of the electrolyte layer 5, namely an electrode material layer extending from the mesh member 31 toward the electrolyte layer 5 (exposed to the electrolyte layer 5) and made of the electrode material 32 (solely constructed from the electrode material 32).

The average thickness of the electrode material layer (length "T" in FIGS. 1 and 2) is preferably 120 μm or less, more preferably 100 μm or less, and even more preferably 80 μm or less. If the average thickness of the portion of the electrode material 32 that does not overlap the mesh member 31 is set to fall within the above range, the effect of the mesh member 31 provided in the cathode 3 becomes conspicuous.

A lower limit of the average thickness is not particularly limited but may be preferably about 5 µm.

Now, description will be made on other configuration examples of the cathode 3.

Figure 2B:
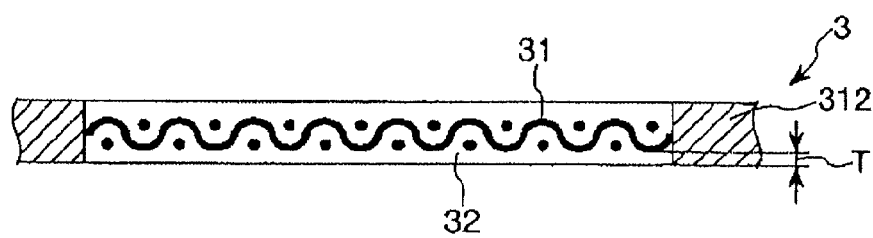

The cathode 3 shown in FIG. 2B includes a base member having an outer frame (reinforcing portion) 312 that extends along an outer circumferential portion of the mesh member 31 and serves to reinforce the mesh member 31. This makes it possible to reliably prevent deformation (expansion, bending, flexion or the like) of the mesh member 31. Accordingly, in the case where the function i) is given to the base member, the function is performed in a more reliable manner.

Figure 2C:
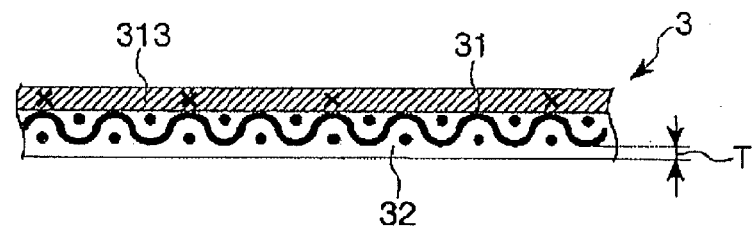

The cathode 3 shown in FIG. 2C includes a base member having a reinforcing plate 313 that is provided on the opposite side of the mesh member 31 from the electrolyte layer 5 and serves to reinforce the mesh member 31.

The reinforcing plate 313 is fixed or attached at different points to the mesh member 31 by virtue of, e.g., spot welding, adhesive bonding or other methods. This configuration also provides the same effect as is offered by the base member shown in FIG. 2B.

Figure 2D:
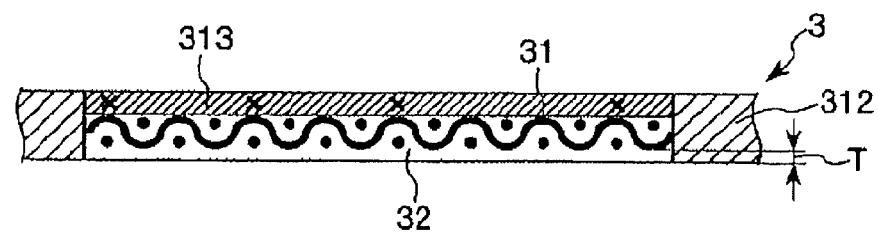

The cathode 3 shown in FIG. 2D includes a base member having an outer frame (reinforcing portion) 312 that extends along an outer circumferential portion of the mesh member 31 and a reinforcing plate 313 that is provided on the opposite side of the mesh member 31 from the electrolyte layer 5. This configuration further improves the effect set forth above.

With the configurations shown in FIGS. 2A and 2B, the base member is arranged substantially at the medial portion in the thickness direction of the cathode 3. Alternatively, the base member may be offset toward or away from the electrolyte layer 5 in the thickness direction of the cathode 3.

Moreover, there is no problem as long as the electrode material 32 constituting the cathode 3 and the anode 4 is made of the material described above. The cathode 3 and the anode 4 may be constructed from the same material or different materials. Furthermore, the configurations of the cathode 3 and the anode 4, i.e., the kinds of the base members shown in FIGS. 2A to 2D, may be identical to or may differ from one another.

The electrolyte layer 5 is provided between the cathode 3 and the anode 4 to make contact with them. During the charge-discharge operations of the secondary battery 1, ions (metal ions) are moved through the electrolyte layer 5.

In the invention, the electrolyte layer 5 is formed by compression-molding electrolyte particles 51. The electrolyte particles 51 are preferably composed of a silver ion conductor or a mixture containing the silver ion conductor (an ion conductor mixture).

Examples of the silver ion conductor include AgI—$Ag_nXO_4$ or AgI—$Ag_nX_2O_4$ (where the X represents W, Cr, Mo, P, V, Te, Se or As) and $Ag_4RbI_5$, one or more of which may be used independently or in combination. Among them, it is preferred that iodinated silver tungstate ($Ag_6I_4WO_4$) exhibiting good thermal stability is used as the silver ion conductor.

Use of this compound makes it possible to improve the performance of the electrolyte layer 5 and, eventually, the characteristics (charge-discharge characteristics) of the secondary battery 1. Furthermore, iodinated silver tungstate is stable in the air and easy to handle.

The average particle size of the electrolyte particles 51 is not particularly limited but may be preferably about 0.1 to 20 µm and more preferably about 1 to 5 µm. Use of the electrolyte particles 51 having such particle size makes it possible to improve the mutual contact of the electrolyte particles 51 in the electrolyte layer 5, and also to increase the bonding area between the electrode active material (particles of the electrode active material) and the electrolyte particles in the electrodes.

Consequently, it becomes possible to sufficiently secure transfer paths of the silver ions (metal ions), thereby further improving the characteristics of the secondary battery 1.

Moreover, the average thickness of the electrolyte layer 5 is preferably about 10 to 300 µm and more preferably about 50 to 200 µm.

The laminated body 2 is constructed from the electrolyte layer 5, the cathode 3 and the anode 4, the cathode and the anode 4 respectively bonded to the surfaces of the electrolyte layer 5. In this regard, it is to be noted that one or more layer of insulating mesh for reinforcement of the electrolyte layer 5 may be provided within the electrolyte layer 5, within the cathode 3, within the anode 4, between the cathode and the electrolyte layer 5, between the anode 4 and the electrolyte layer 5, or the like.

Furthermore, the cathode lead 6 and the anode lead 7 exhibiting electrical conductivity are respectively connected to the cathode 3 and the anode 4 and serve as lead lines (conductive portions) through which electricity is charged to or discharged from the secondary battery 1.

Almost all of the laminated body 2 excepting the cathode lead 6 and the anode lead 7 is covered with the restrictor 8, thus allowing the cathode lead 6 and the anode lead 7 to be exposed to the outside.

The restrictor 8 serves mainly to restrict expansion of the cathode (electrode layer) 3 in the plane direction thereof (in a direction generally perpendicular to the direction crossing the cathode 3 and the anode 4, i.e., a vertical direction in FIG. 1) and the resultant expansion of the electrolyte layer 5 in the plane direction thereof.

In the secondary battery 1, the crystal structures of the electrode active material are three-dimensionally deformed (expanded or contracted) in response to the charge-discharge operations.

In a hypothetical case that the secondary battery is not provided with the restrictor 8, the cathode 3 and the anode are heavily deformed (expanded or contracted) in the plane direction thereof but not in the thickness direction thereof as the crystal structures of the electrode active material are three-dimensionally deformed or changed.

As a result, especially in the peripheral portion of the cathode 3 and the anode 4, a bond inhibition phenomenon that breaks or disconnects the above-mentioned electronic bond or ion-conducting path is created. This makes it difficult for an electric current to flow through the peripheral portions of the cathode 3 and the anode 4 when charging or discharging the secondary battery.

Further, at this time, the electrolyte layer 5 is also deformed (expanded or contracted) in the plane direction thereof due to the expansion or contraction of the cathode 3 and the anode 4 in the plane direction thereof, thereby forming a portion that protrudes from the cathode 3 and the anode 4. As mentioned earlier, in the protruding portion the ion-conducting path is broken.

This phenomenon proceeds gradually as the secondary battery is repeatedly charged and discharged. As a consequence, the battery capacity of the secondary battery is gradually reduced, making it difficult to charge and discharge the secondary battery.

In contrast, the secondary battery 1 of the invention is configured to have the restrictor 8 that serves to restrict expansion of the cathode (electrode layer) 3 in the plane direction thereof (the vertical direction in FIG. 1) and the resultant expansion of the electrolyte layer 5 in the plane direction thereof. Thus, the secondary battery 1 can be kept in a shape as close to the initial shape as possible when manufacturing the secondary battery 1 and charging and discharging the same.

That is to say, the afore-mentioned problem can be avoided by restricting expansion of the cathode (electrode layer) 3 and the electrolyte layer 5 in the plane direction thereof. As a result, it becomes possible to avoid battery capacity reduction which would otherwise occur over the lapse of charge-discharge cycles (by the multiple times of charge-discharge operations).

The restrictor 8 is preferably made of an insulating material. This helps to reliably prevent short-circuit between the cathode 3 and the anode 4. Alternatively, the restrictor 8 may be made of a conductive material (a metallic material or the like), in which case it is desirable to interpose an insulating layer (an insulating sheet) between the laminated body 2 and the restrictor 8.

Examples of the insulating material include various kinds of resin materials such as thermoplastic resin, thermosetting resin and photocurable resin, various kinds of glass materials and various kinds of ceramics materials.

Among these materials, it is desirable that the insulating material is mainly any one of thermoplastic resin, thermosetting resin, photocurable resin and low-melting-point glass or a combination of two or more of them. Use of these materials allows the restrictor 8 to be formed with ease. Furthermore, use of these materials helps to increase the mechanical strength of the restrictor 8.

Examples of the thermoplastic resin include polyolefin, ethylene-vinyl acetate copolymer, polyamide, polyimide and hot-melt resin. Examples of the thermosetting resin include epoxy-based resin, polyurethane-based resin and phenol-based resin.

Further, examples of the photocurable resin include epoxy-based resin, urethane acrylate-based resin and vinyl ether-based resin. Examples of the low-melting-point glass include $P_2O_5$—CuO—ZnO-based low-melting-point glass, $P_2O_5$—SnO-based low-melting-point glass and $B_2O_3$—ZnO—$Bi_2O_3$—$Al_2O_3$-based low-melting-point glass.

The average thickness of the restrictor 8 (particularly, the average thickness of a side surface thereof) is preferably about 50 to 5000 μm and more preferably about 100 to 500 μm, although it may be slightly changed depending on the constituent material and intended use of the restrictor 8. By setting the average thickness within this range, it is possible to reliably prevent expansion of the cathode (electrode layer) 3 and the electrolyte layer 5 in the plane direction thereof, thereby allowing the restrictor 8 to play its role in a reliable manner.

For example, the secondary battery 1 described above can be manufactured through the following steps.

Figure 3:
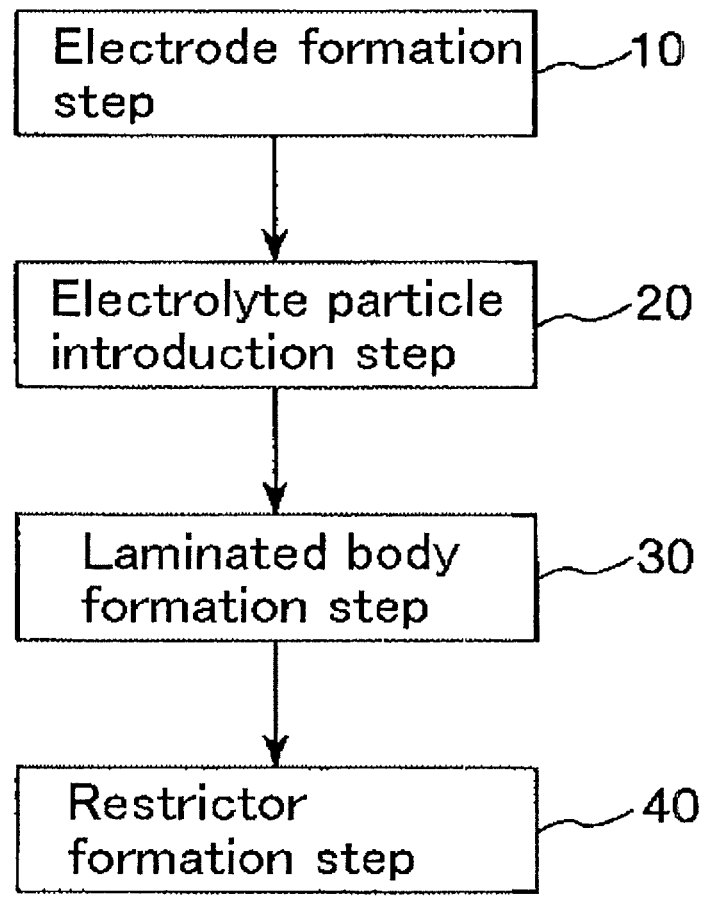
FIG. 3 is a flowchart illustrating a method for manufacturing the secondary battery in accordance with the invention.
Figure 4A:
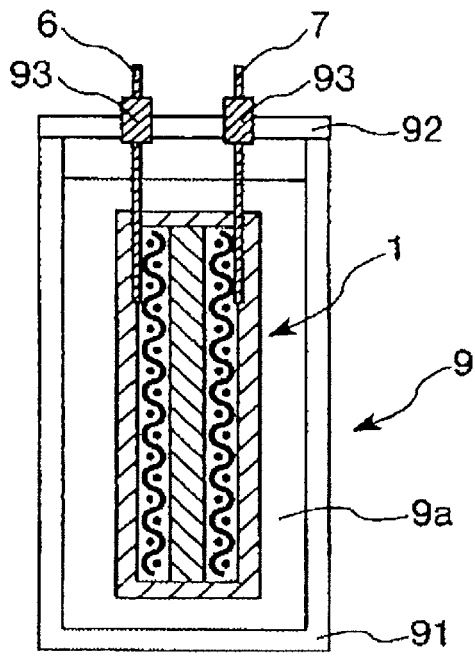
FIG. 4A to FIG. 4D are respectively vertical section views of configuration examples of a secondary battery in accordance with a second embodiment of the invention.
Figure 4B:
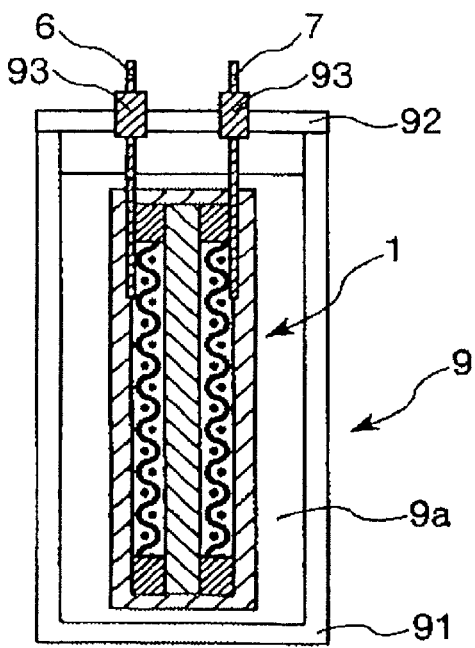
Figure 4C:
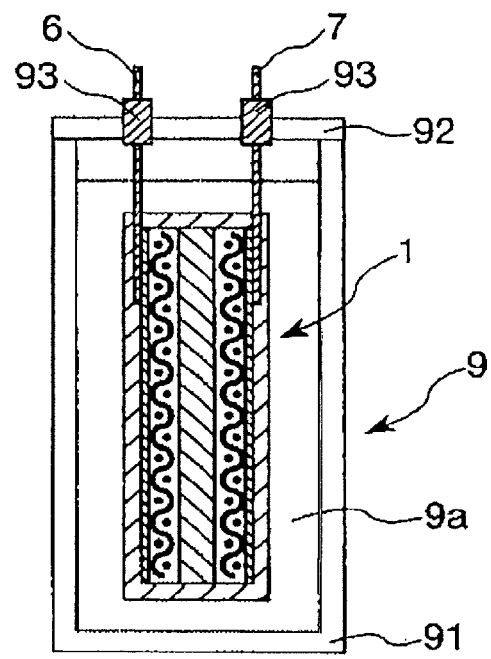
Figure 4D:
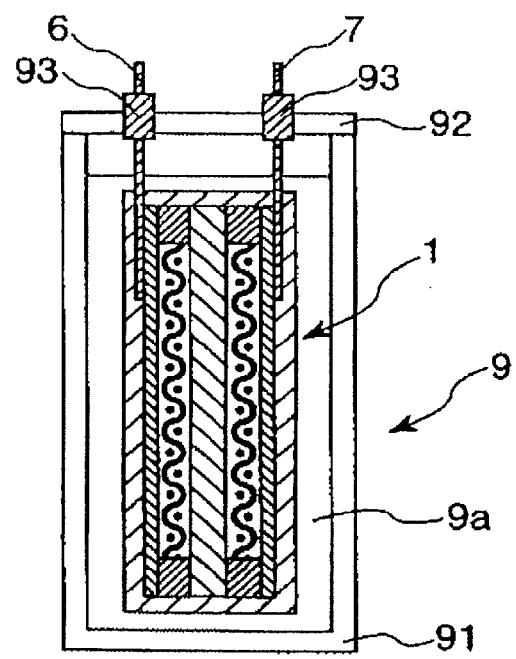

FIG. 3 is a flowchart illustrating a method for manufacturing the secondary battery in accordance with the invention.

Referring to FIG. 3, a method for manufacturing the secondary battery in accordance with the invention includes an electrode formation step 10 of forming electrodes within a mold, an electrolyte particle introduction step 20 of introducing the electrolyte particles 51 onto the cathode 3, a laminated body formation step 30 of forming the laminated body 2 by pressing the interior of the mold, and a restrictor formation step 40 of forming the restrictor 8 so as to cover all of the laminated body 2.

Hereinafter, the respective steps will be described one by one.

<A> Electrode Formation Step (First Step) 10

First, a female mold 500 having a cylindrical hole as shown in FIG. 14 is prepared. Subsequently, in the case of using the base member (mesh member 31) illustrated in FIGS. 2A and 2B, the electrode material 32 is filled in the cylindrical hole of the female mold 500 in a state that a lower male mold 400 has been inserted into the cylindrical hole.

Then, an upper male mold 600 is inserted into the cylindrical hole to perform preliminary press-forming. After removal of the upper male mold 600, the base member is inserted into the cylindrical hole. Thereafter, the upper male mold 600 is inserted into the cylindrical hole again and the base member is pressed into the electrode material 32 to thereby form the cathode 3.

Similarly, in the case of using one of the mesh members 31 illustrated in FIGS. 2C and 2D, the electrode material 32 is filled in the cylindrical hole of the female mold 500 in a state that the lower male mold 400 has been inserted into the cylindrical hole. Then, the upper male mold 600 is inserted into the cylindrical hole to perform preliminary press-forming.

In this process, the base member is inserted into the cylindrical hole in such a manner that the through-holes 311 of the base member are faced downwardly. Then, the electrode material 32 is press-filled in the through-holes 311 of the base member to thereby form the cathode 3 having a disc shape.

In this regard, it is to be noted that the preliminary press-forming process of the electrode material 32 may be omitted. Further, the molds are not limited to the metallic ones. It is needless to say that the molds may be made of, e.g., resin or ceramics.

In this regard, the press-forming pressure is preferably at least 3 tons/cm$^2$ and more preferably equal to or greater than 5 tons/cm$^2$. This makes it possible to suitably compress the electrode material 32 and also to fill the electrode material 32 in the through-holes 311 of the base member.

Prior to forming the cathode 3, the anode 4 can be formed by performing the same step as the one described just above and taking out the anode 4 from the cylindrical hole.

<B> Electrolyte Particle Introduction Step (Second Step) 20

Next, the female mold 500 is turned over without having to remove the cathode 3 from the cylindrical hole. Thereafter, the lower male mold 400 is removed from the female mold 500, and then the electrolyte particles (solid electrolyte particles) 51 are filled into the cylindrical hole so that the electrolyte particles 51 are placed onto the cathode 3. Thereafter, the anode 4 produced beforehand is placed onto the electrolyte particles 51. If needed, a mold release agent may be applied to an inner surface of the cylindrical hole.

<C> Laminated Body Formation Step (Third Step) 30

Next, the lower male mold 400 that has been removed is set to the female mold 500 again and is pushed down so that the cathode 3 and the anode 4 (a pair of electrodes) can be pressed against and bonded to the electrolyte layer 5 within the female mold 500. This produces the laminated body 2 in which the electrolyte layer 5 is interposed between the cathode 3 and the anode 4 in a bulk state.

In this regard, it is to be noted that in the case of using the mesh member 31 illustrated in FIGS. 2A and 2B, the electrolyte particle introduction step <B> and the laminated body formation step <C> may be carried out without turning over the female mold 500.

The pressure applied at this time is preferably equal to or greater than 2 tons/cm$^2$, more preferably equal to or greater than 3 tons/cm$^2$, and even more preferably equal to or greater than 4 tons/cm$^2$. This ensures that the laminated body 2 is sufficiently compressed.

As a result, it is possible to avoid the above-mentioned formation of the gaps (spaces) between the electrolyte particles 51 or between the electrodes and the electrolyte layer 5 and deposition of metallic silver contained in the electrode active materials or electrolyte material into the gaps during the charge-discharge operations, that is, the above-mentioned formation of the grain boundaries composed of the metallic silver between the electrolyte particles 51 in the electrolyte layer 5 or between the electrodes and the electrolyte layer 5 when the secondary battery 1 is in use. Thus, it is possible to improve the characteristics of the secondary battery 1 obtained.

Due to the fact that the cathode 3 and the anode 4 are provided with the base member, it becomes possible to surely prevent deformation of the cathode 3 and the anode 4, thereby avoiding deformation of the electrolyte layer 5 in a reliable manner.

<D> Restrictor Formation Step (Fourth Step) 40

Next, the pressure applied in the laminated body formation step <C> is released and the thus formed laminated body 2 is removed or separated from the female mold 500, and then almost all of the laminated body 2 is covered with the restrictor 8.

In the case where the restrictor 8 is made of, e.g., hot-melt resin (a hot-melt adhesive agent) or low-melting-point glass, it is possible to form the restrictor 8 by melting or softening the hot-melt resin or the low-melting-point glass, supplying the same on the outer circumferential surface of the laminated body 2 and allowing the same to be cooled down and solidified. This method ensures that the restrictor 8 is reliably formed so as to cover almost all of the laminated body 2.

Various kinds of methods can be used to supply the hot-melt resin or the low-melting-point glass in a melt or softened state (liquid state) to the outer circumferential surface of the laminated body 2.

Examples of these methods include: i) a method of dipping the laminated body 2 into the hot-melt resin or the low-melting-point glass in a liquid state (a dipping method); ii) a method of coating the hot-melt resin or the low-melting-point glass in a liquid state on the outer circumferential surface of the laminated body 2 (a coating method); and iii) a method of injecting liquid resin, by a vacuum encapsulation method (a degassing method), into a battery container 9 that accommodates the laminated body 2 and remains closed by a lid 92 having a resin injection port, the cathode lead 6 and the anode lead 7 extending through insulation tubes 93 secured to the lid 92, and then solidifying the resin to seal off the resin injection port.

In this regard, it is to be noted that the method iii) is illustrated in FIG. 4A to FIG. 4D and will be described later in detail.

Further, in the case where the restrictor 8 is made of, e.g., thermosetting resin or photocurable resin, it is possible to form the restrictor 8 by supplying an uncured resin material in a liquid state to the outer circumferential surface of the laminated body 2 and solidifying the same through heating or light irradiation. Use of this method also makes it possible to reliably form the restrictor 8 so that it can cover substantially the entirety of the laminated body 2.

Furthermore, by forming the restrictor 8 by means of the vacuum encapsulation method, it is possible to prevent or suppress an air bubble (space) from generating within the restrictor 8. This makes it possible to improve the mechanical strength of the restrictor 8. As a result, it is possible to restrict the expansion of the electrolyte layer 5 and the electrodes 3 and 4 in the plane direction thereof reliably. Therefore, a secondary battery which can prevent reduction of a battery capacity over the lapse of charge-discharge cycles reliably can be obtained.

The above-noted methods for supplying the hot-melt resin or the low-melting-point glass in a liquid state can be equally used in supplying the uncured resin material to the outer circumferential surface of the laminated body 2.

Preferably, the present step is started immediately after releasing the pressure at the end of the laminated body formation step <C>. In other words, the restrictor 8 should preferably be formed before the laminated body 2 restores its original thickness after release of the pressure applied thereto. By doing so, the restrictor 8 can be formed so as to cover the entirety of the laminated body 2 in a state that the laminated body 2 is possibly kept in the pressed shape.

This makes it possible to reliably manufacture the secondary battery 1 in which the overall shape of the laminated body 2 is kept as close to the initial shape as possible. This suppresses or prevents the formation of the grain boundaries composed of the metallic silver in the electrolyte layer 5 or between the electrodes and the electrolyte layer 5 during the charge-discharge operations.

More specifically, when the average thickness of the laminated body 2 immediately after press-forming and removing the same from the mold is defined as A ($\mu$m) and the average thickness of the laminated body 2 immediately before the step of forming the restrictor 8 over the laminated body 2 is defined as B ($\mu$m), the relationship A/B is preferably equal to or greater than 0.95 and more preferably about 0.97 to 0.99. This helps to provide the afore-mentioned effect in a more reliable manner.

In this regard, it is to be noted that the restrictor 8 may be formed so as to cover the end portion of the laminated body 2 in a state that the laminated body 2 is removed from the female mold 500 while maintaining the pressure applied to the laminated body 2 by the lower male mold 400 and the upper male mold 600, that is, before releasing the pressure at the end of the laminated body formation step <C>. In this modification, the female mold 500 is formed into a type that can be separated into two or more pieces for removal from the laminated body 2.

In the case where the present step is started after release of the pressure applied to the laminated body 2, the time taken from the pressure release to initiation of the present step is preferably equal to or shorter than 300 minutes, more preferably equal to or shorter than 60 minutes, and even more preferably about 1 to 60 minutes, although it may somewhat vary with the kinds of the electrolyte materials used.

By starting the present step within the time noted above, it becomes possible to suppress or prevent thickness restoration of the laminated body 2 when the latter is released from the pressurized state. This makes it possible to suitably suppress or prevent reduction in battery capacity.

The secondary battery 1 can be manufactured through the steps described above.

The restrictor 8 is not limited to the monolayer structure set forth above in respect of the present embodiment but may be of, e.g., a laminated structure (multilayer structure) having two or more insulating layers made of the above-noted insulating materials. The restrictor 8 of such a structure can be formed by performing the step <D> several times.

Although the restrictor 8 employed in the present embodiment is of the type covering almost all of the laminated body 2, it is sufficient that the restrictor 8 is provided so as to partially cover four side surfaces (end portion) of the laminated body 2. Use of the restrictor 8 of such a configuration also makes it possible to sufficiently restrict expansion of the electrolyte layer 5 in the plane direction thereof.

However, it should be understood that, in the case where the restrictor 8 is formed so as to cover almost all of the laminated body 2, the function of restricting expansion of the electrolyte layer 5 in the plane direction thereof is played noticeably. By doing so, it is also possible to secure the mechanical strength of the secondary battery 1 as a whole and to allow the restrictor 8 to serve as a protection layer for the laminated body 2.

Second Embodiment

Next, description will be made on a secondary battery in accordance with a second embodiment of the invention.

FIG. 4A to FIG. 4D are respectively vertical section views of configuration examples of a secondary battery in accordance with the second embodiment of the invention.

In the following description, the upper side in FIG. 4A to FIG. 4D will be referred to as "top" or "upper" and the lower side will be referred to as "bottom" or "lower", only for the sake of better understanding.

Hereinafter, the second embodiment will be described with emphasis placed on the points differing from the first embodiment. No description will be given on the same points as in the first embodiment.

In the second embodiment, the secondary battery 1 mentioned in the first embodiment is received in a battery container 9 and secured in place by means of a fixing member 9a.

In this regard, it is to be noted that FIGS. 4A to 4D show secondary batteries differing form one another in the configurations of the cathode 3 and the anode 4, which correspond to FIGS. 2A to 2D, respectively.

By accommodating the secondary battery 1 within the battery container 9, it is possible to reliably restrict expansion of the electrode layers (cathode 3 and anode 4) and the electrolyte layer 5 in the plane direction thereof. In this sense, the battery container 9 and the fixing member 9a may be considered to constitute parts of the restrictor 8.

Such a battery configuration helps to prevent infiltration of external moisture into the secondary battery 1 and can be suitably employed in constructing an all-solid secondary battery (particularly, a lithium-ion-conducting secondary battery set forth later).

The battery container 9 includes a container body 91 of a bottom-closed hollow cylindrical shape and a lid 92 for closing a top opening of the container body 91. The cathode lead 6 and the anode lead 7 are inserted through the lid 92 and fixed or attached to the lid 92 by way of insulation members (insulation tubes) 93 so that they can be kept free from short-circuit.

Examples of a constituent material of the battery container 9 (the container body 91 and the lid 92) include various kinds of metallic materials such as aluminum, copper, brass and stainless steel, various kinds of resin materials, various kinds of ceramics materials, various kinds of glass materials, and various kinds of composite materials consisting of metal and resin.

The secondary battery 1 with the battery container 9 noted above is manufactured by, e.g., filling curable resin of an uncured state such as thermosetting resin or photocurable resin in the container body 91, placing the secondary battery 1 into the container body 91 and then curing the curable resin so that it can serve as the fixing member 9a. In place of the curable resin, the thermoplastic resin or the low-melting-point glass mentioned earlier may be used as the fixing member 9a.

In this regard, in the case where the laminated body 2 covered with the restrictor 8 has a shape corresponding to the internal dimension of the container body 91, the fixing member 9a may be omitted.

While the silver-ion-conducting secondary battery has been described in the above embodiments as an example of the secondary battery in accordance with the invention, the present secondary battery can be also applied to various kinds of ion-conducting secondary batteries, including a lithium-ion-conducting secondary battery.

In the case where the present secondary battery is applied to the lithium-ion-conducting secondary battery, it is possible to use the below-listed materials as an electrode active material contained in the constituent material of the cathode 3 and the anode 4.

More specifically, examples of the cathode active material include: transition metal oxide materials such as lithium cobaltate ($Li_xCoO_2$), lithium nickelate ($Li_xNiO_2$), lithium nickel cobaltate ($LiCo_{0.3}Ni_{0.7}O_2$), lithium manganate ($LiMn_2O_4$), lithium titanate ($Li_{4/3}Ti_{5/3}O_4$), lithium manganate compound ($LiM_yMn_{2-y}O_4$, where the M is Cr, Co or Ni), lithium iron phosphate and olivine compound, which is one kind of lithium iron phosphate compound ($Li_{1-x}FePO_4$ and $Li_{1-x}Fe_{0.5}Mn_{0.5}PO_4$); sulfide-based chalcogen compound such as $TiS_2$, $VS_2$, FeS and $M.MoS_8$ (where the M is transition metal such as Li, Ti, Cu, Sb, Sn, Pb and Ni); and lithium metal oxide containing metal oxide as its skeleton, such as $TiO_2$, $Cr_3O_8$, $V_2O_5$, $MnO_2$ and $CoO_2$, one or more of which may be used independently or in combination.

On the other hand, examples of the anode active material include metallic materials, such as lithium, indium, aluminum, tin, bismuth and lead, and oxide of these metallic materials, one or more of which may be used independently or in combination or in the form of alloy.

The cathode active material and the anode active material are not particularly limited to the ones noted above. There is no problem if a material exhibiting electropositive potential against the anode active material is selected as the cathode active material through the combination of the afore-mentioned materials. By adopting such a configuration, it is possible to provide the secondary battery 1 having an arbitrary discharge voltage.

Furthermore, it is preferred that a lithium ion conductor or an electron-ion conducting material (e.g., the electrode active material) is independently used as the solid electrolyte material mixed into the electrode material.

Examples of the lithium ion conductor include: a sulfide-based (amorphous) lithium ion conductor containing lithium sulfide ($Li_2S$), silicon sulfide ($SiS_2$) and lithium phosphate ($LiPO_4$); a sulfide-based (amorphous) lithium ion conductor containing phosphorus sulfide ($P_2S_5$) and lithium sulfide ($Li_2S$); and crystalline lithium ion conductors such as $Li_{3.25}Ge_{0.25}P_{0.75}S_4$, $Li_{1.3}Al_{0.3}Ti_{1.7}(PO_4)_3$ and $Li_{3.6}Ge_{0.6}V_{0.4}O_4$, one or more of which may be used independently or in combination.

Among them, it is preferred that the sulfide-based lithium ion conductors exhibiting good ion conductivity is used as the lithium ion conductor. By manufacturing the secondary battery 1 using the sulfide-based lithium ion conductors as the solid electrolyte material, it is possible to improve the characteristics of the secondary battery 1.

Furthermore, it is preferred that the sulfide-based lithium ion conductors contain at least one of a crystalline lithium ion conductor and an amorphous lithium ion conductor. The crystalline lithium ion conductor is a material that endows the electrolyte with the most superior lithium ion conductivity and exhibits good moldability. Therefore, use of the crystalline lithium ion conductor in manufacturing the secondary battery 1 provides an advantage that the output current density can be kept high.

On the other hand, the amorphous lithium ion conductor does not give anisotropic conductivity to the material made therefrom, exhibits high heat stability and has a softening temperature. Therefore, use of the amorphous lithium ion conductor makes it possible to form the electrodes while heating the ion conductor up to its softening temperature. This helps to maintain the ion-conducting path to the electrode active material in a good state. Consequently, the amorphous lithium ion conductor provides an advantage that the permissible temperature range can be kept broad when manufacturing and using the secondary battery 1.

If the crystalline lithium ion conductor and the amorphous lithium ion conductor are used in combination, it becomes possible to enjoy all the advantages offered by them.

While the secondary battery in accordance with the invention has been described with reference to the illustrated embodiments, the invention is not limited thereto. Individual parts constituting the secondary battery may be substituted by other arbitrary ones capable of performing similar functions. Moreover, arbitrary structural parts may be added if necessary.

Furthermore, it may be possible in the invention that only one of the cathode and the anode has the configuration set forth above. Even if the base member (mesh member) is omitted from the cathode and the anode, it would be possible to attain the advantageous effects noted above, whether great or not.

EXAMPLES

Now, description will be made on concrete experimental examples of the invention.

Silver-Ion-Conducting Secondary Battery

Example 1

Sample No. 1A

Invention

Step I: First, an electrode mixture material (electrode material) was prepared by mixing $\delta\text{-Ag}_{0.7}V_2O_5$ (cathode active material) particles having an average particle size of 5 μm and $Ag_6I_4WO_4$ (solid electrolyte) particles having an average particle size of 5 μm in a ratio of 5:5 by weight.

Step II: Next, the female mold 500 having a cylindrical hole of 1.2 cm in diameter as shown in FIG. 14 was prepared for use. In a state that the lower male mold 400 was inserted into the cylindrical hole of the female mold 500, 65 mg of the electrode mixture material was filled in the cylindrical hole and a top surface of a layer formed of the electrode mixture material was leveled. Then, the upper male mold 600 was inserted into the cylindrical hole and preliminarily pressed at a pressure of 0.5 ton/cm$^2$.

Thereafter, the upper male mold 600 was removed from the female mold 500. Further, the mesh member 31 was prepared by cutting an expanded copper mesh (having an average thickness of about 100 μm and a through-hole occupation percentage of 80% in a plan view) into a disc-shape, as shown in FIG. 2A. The mesh member 31 was inserted into the cylindrical hole of the female mold 500.

Step III: Next, the upper male mold 600 was inserted into the cylindrical hole again and pressed at a pressure of 1 ton/cm$^2$ to form a disc-shaped cathode. The thus obtained cathode had an average thickness of about 110 μm. Thereafter, the upper male mold 600 was removed from the female mold 500.

Step IV: Next, 100 mg of the $Ag_6I_4WO_4$ (solid electrolyte) particles were filled in the cylindrical hole without having to remove the cathode, and then a top surface of a layer formed of the $Ag_6I_4WO_4$ particles was leveled. Then, an anode produced in advance in the same manner as the cathode was inserted into the cylindrical hole so as to be placed on the particles.

Step V: Next, the upper male mold 600 was inserted into the cylindrical hole again and pressed at a pressure of 5 tons/cm$^2$ to produce a laminated body (battery element) 2. The thus obtained laminated body 2 had an electrolyte layer 5 whose average thickness was about 150 μm.

Step VI: Next, the laminated body 2 was taken out from the female mold 500 and copper foil lead plates were attached to the cathode and the anode by spot welding, thereby forming a cathode lead and an anode lead.

Step VII: Next, ethylene-vinyl acetate copolymer-based hot-melt resin having a melting temperature of about 100° C. was supplied in a molten state by a dipping method so that it could cover almost all of the laminated body 2. Thereafter, the hot-melt resin was cooled and solidified to form a restrictor 8 compressing the laminated body 2. The thus formed restrictor 8 had an average thickness of about 200 μm.

It took about 60 minutes to supply the hot-melt resin after removal of the laminated body 2 from the female mold 500. When the average thickness of the laminated body 2 immediately after the step V was defined as A (μm) and the average thickness of the laminated body 2 immediately before the present step VII was defined as B (μm), the relationship A/B was equal to 0.97.

Figure 5:
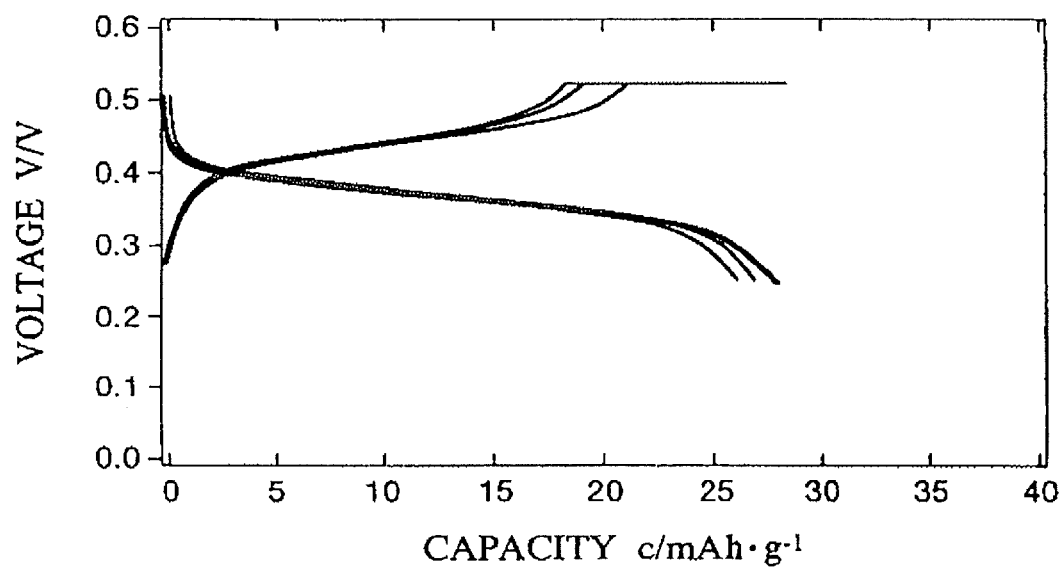
FIG. 5 is a graph showing the charge-discharge behavior in charge-discharge cycles of the secondary battery of Sample No. 1A (Invention).

The secondary battery 1 as shown in FIG. 1 was obtained through the steps set forth above. The charge-discharge behavior of the thus obtained secondary battery 1 was examined by a charge-discharge cycle test, the results (charge-discharge characteristics) of which are shown in FIG. 5.

The charge-discharge characteristics were measured by charging the battery up to 0.55 V at the constant current density of 100 μA/cm$^2$, stopping the charge operation at the moment when the electric current became equal to 20 μA, and then discharging the battery at the constant current density of 100 μA/cm$^2$. The secondary battery had a discharge capacity of about 25 mAh/gr.

Figure 6:
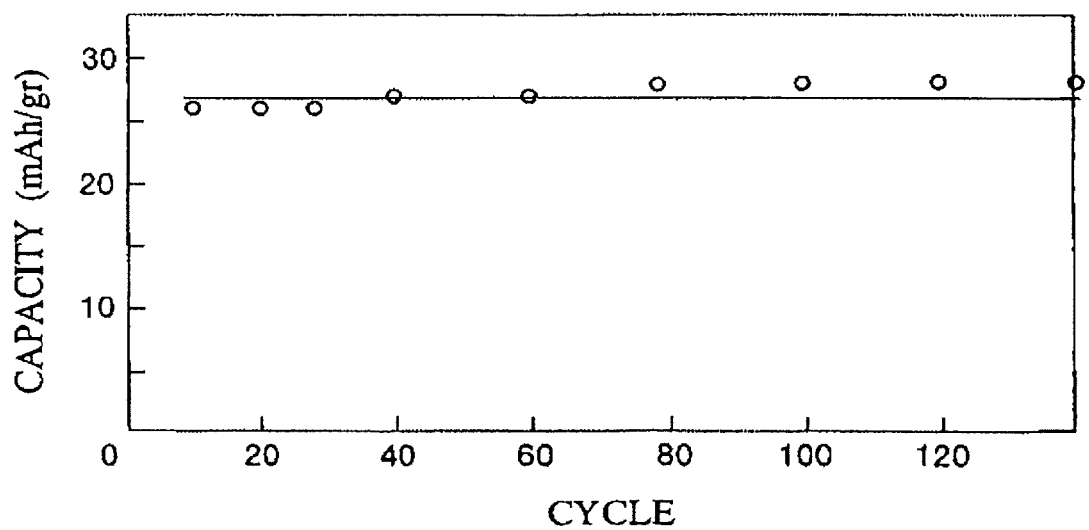
FIG. 6 is a graph showing the variation in discharge capacity over the lapse of discharge cycles of the secondary battery of the Sample No. 1A (Invention).

Further, the variation in discharge capacity over the lapse of charge-discharge cycles is illustrated in FIG. 6. Referring to FIG. 6, it can be seen that the discharge capacity was hardly reduced but slightly increased along with the lapse of charge-discharge cycles.

Sample No. 1B

Comparative Example

The laminated body (battery element) produced in the same manner as applied to the Sample No. 1A, i.e., the laminated body obtained through the Steps I to V, was received in the coin battery container (CR1616-type) as shown in FIG. 16 and a secondary battery (coin-type secondary battery) was manufactured by pressing the sealing plate.

Figure 7:
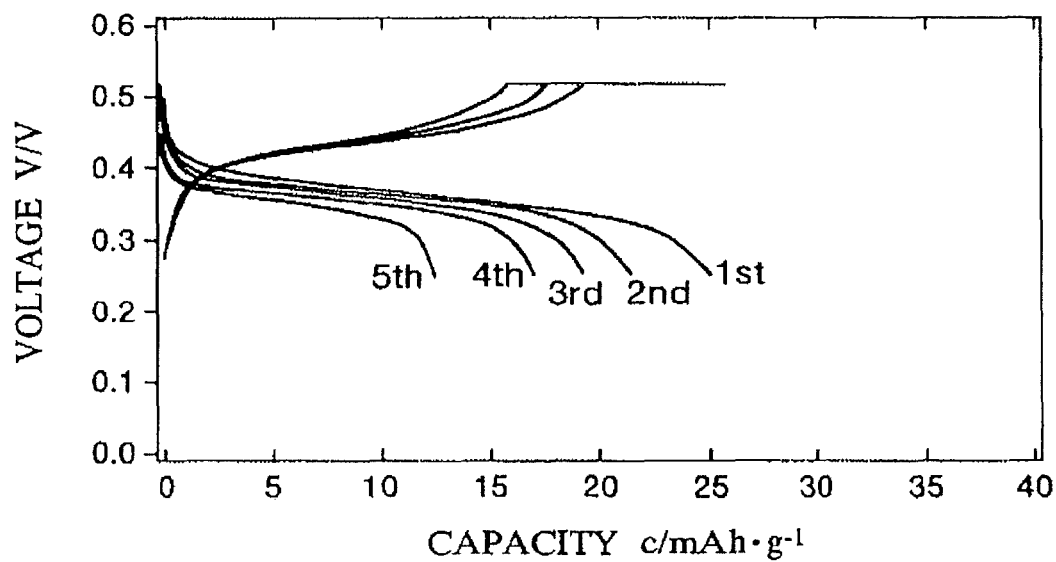
FIG. 7 is a graph showing the charge-discharge behavior in charge-discharge cycles of the secondary battery of the Sample No. 1B (Comparative Example).
Figure 8:
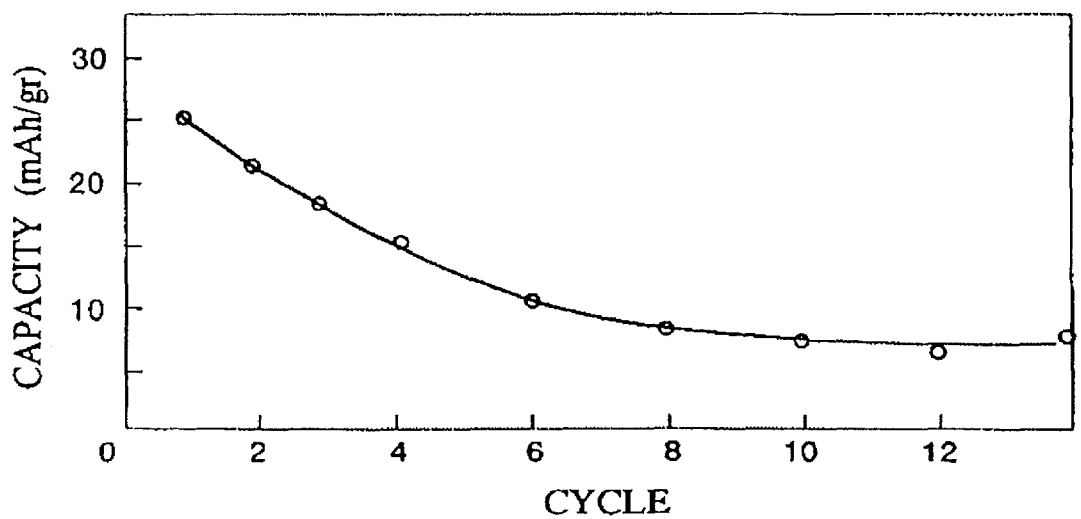
FIG. 8 is a graph showing the variation in discharge capacity over the lapse of charge-discharge cycles of the secondary battery of Sample No. 1B (Comparative Example).

The discharge behavior of the thus obtained secondary battery was examined by a charge-discharge cycle test in the same manner as applied to the Sample No. 1A, the results (charge-discharge characteristics) of which are shown in FIG. 7. Further, the variation in discharge capacity over the lapse of charge-discharge cycles is illustrated in FIG. 8.

As a result, the discharge capacity relative to the initial charge was about 25 mAh/gr (about 80% of the charge capacity). In the second charge operation, the secondary battery could be charged with the charge capacity of about 27 mAh/gr but the discharge capacity was reduced to about 21 mAh/gr.

The discharge capacity of the battery was decreased along with the lapse of charge-discharge cycles for a little while. After the lapse of about ten cycles, the discharge capacity was reduced to about 7 mAh/gr. Then, the discharge capacity was converged to a constant value.

As is apparent from the results of the Example 1, in the case of the secondary battery of the Sample No. 1A in which the laminated body was covered with hot-melt resin, the battery capacity was scarcely reduced over the lapse of charge-discharge cycles.

In contrast, the secondary battery of the Sample No. 1B in which the laminated body was not covered with hot-melt resin (the laminated body was not compressed in its entirety) exhibits such charge-discharge characteristics that the discharge capacity thereof was decreased along with the lapse of charge-discharge cycles and, eventually, reduced to one thirds or less after the lapse of about ten charge-discharge cycles.

Example 2

Next, examination was conducted to ascertain the influence on the charge-discharge characteristics exerted by a difference in the quantity of an electrode mixture material used in forming the electrodes.

Sample No. 2A

Invention

A secondary battery was manufactured in the same manner as applied to the Sample No. 1A, except that the filling quantity of the electrode mixture material was changed to 49 mg.

Sample No. 2B

Invention

A secondary battery was manufactured in the same manner as applied to the Sample No. 1A, except that the filling quantity of the electrode mixture material was changed to 62 mg.

Sample No. 2C

Invention

A secondary battery was manufactured in the same manner as applied to the Sample No. 1A, except that the filling quantity of the electrode mixture material was changed to 86 mg.

Sample No. 2D

Invention

A secondary battery was manufactured in the same manner as applied to the Sample No. 1A, except that the filling quantity of the electrode mixture material was changed to 110 mg.

Sample No. 2E

Invention

A secondary battery was manufactured in the same manner as applied to the Sample No. 1A, except that the filling quantity of the electrode mixture material was changed to 132 mg.

Figure 9:
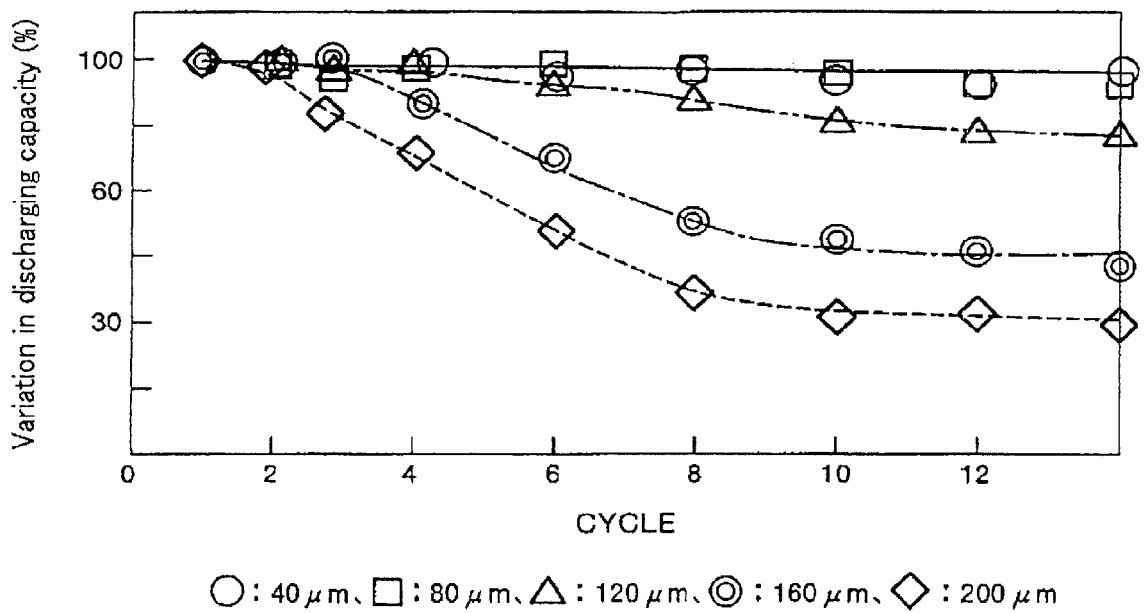
FIG. 9 is a graph showing the variation in battery capacity over the lapse of charge-discharge cycles of the secondary batteries of the respective sample numbers.

The portion of each electrode that did not overlap the expanded copper mesh at the side of the electrolyte layer 5 when seeing the cathode and the anode in a side view, i.e., the electrode material layer where the electrode mixture material existed alone, had an average thickness (the length "T" in FIGS. 1 and 2) of about 40 μm, about 80 μm, about 120 μm, about 160 μm and about 200 μm in the secondary batteries of the respective sample numbers:

The charge-discharge behavior of the secondary batteries of the respective sample numbers was examined to ascertain the variation in battery capacity over the lapse of charge-discharge cycles. The variation in discharge capacity over the lapse of charge-discharge cycles is shown in FIG. 9. In this regard, the discharge capacity is shown under the assumption that the initial capacity was equal to 100%. In FIG. 9, symbols "○", "□", "Δ", "☉" and "◇" represent the examination results of Sample Nos. 2A, 2B, 2C, 2D and 2E, respectively.

As can be seen in FIG. 9, if the portion of each electrode where the electrode mixture material existed alone had an average thickness of about 160 μm or more, the discharge capacity was reduced to 45% or less at around ten charge-discharge cycles. If the average thickness was about 120 μm, the discharge capacity was maintained to 75% or more at around ten charge-discharge cycles. If the average thickness was equal to or smaller than 80 μm, degradation in discharge capacity over the lapse of charge-discharge cycles was noticeably stopped.

Example 3

Next, examination was conducted to ascertain the influence on the charge-discharge characteristics exerted by a difference in the thickness of an expanded copper mesh.

Secondary batteries were manufactured in the same manner as applied to the Example 2, except the use of an expanded copper mesh having an average thickness of 180 μm.

Cathodes and anodes were produced by filling an electrode mixture material in the filling quantities of 50 mg, 74 mg, 97 mg, 121 mg and 144 mg. As was the same with the case to the Example 2, the portion of each electrode that did not overlap the expanded copper mesh at the side of the electrolyte layer, i.e., the portion where the electrode mixture material existed alone, had an average thickness of about 40 μm, about 80 μm, about 120 μm, about 160 μm and about 200 μm in the respective secondary batteries.

The charge-discharge behavior of the resultant secondary batteries was examined by a charge-discharge cycle test in the same manner as applied to the Sample No. 1A. The results showed that the secondary batteries had almost the same charge-discharge behavior as that of the secondary batteries of the Example 2.

In other words, if the portion of each electrode where the electrode mixture material existed alone had an average thickness of about 160 μm or more when using the expanded copper mesh of 180 μm in average thickness, the discharge capacity was reduced to about one thirds of the initial capacity at around ten charge-discharge cycles. If the average thickness was equal to or smaller than 160 μm, degradation in discharge capacity over the lapse of charge-discharge cycles was noticeably stopped.

Accordingly, as is apparent from the examination results of the Examples 2 and 3, the reduction in battery discharge capacity over the lapse of charge-discharge cycles could be surely prevented by constructing the electrodes (cathode and anode) in such a manner that the portion of each electrode that did not overlap the expanded copper mesh in a side view, i.e., the portion where the electrode mixture material existed alone, had an average thickness of about 120 μm or less.

Example 4

Next, examination was conducted to ascertain the influence on the charge-discharge characteristics exerted by a difference in the shape of an expanded copper mesh.

A secondary battery was manufactured in the same manner as applied to the Sample No. 1A, except the use of a female mold 500 having a cylindrical hole of 1 cm in diameter and the use of an expanded copper mesh having an average thickness of about 180 μm and a shape shown in FIG. 2B. In the thus obtained secondary battery, the cathode and the anode had an average thickness of about 210 μm.

The charge-discharge behavior of the resultant secondary battery over the lapse of charge-discharge cycles was examined in the same manner as applied to the Sample No. 1A. The results showed that the secondary battery had almost the same charge-discharge behavior as that of the Sample No. 1A.

Example 5

Examination was further conducted to ascertain the influence on the charge-discharge characteristics exerted by a difference in the shape of an expanded copper mesh.

A secondary battery was manufactured in the same manner as applied to the Example 4, except the use of an expanded copper mesh having a shape shown in FIG. 2C.

The charge-discharge behavior of the resultant secondary battery over the lapse of charge-discharge cycles was examined in the same manner as applied to the Sample No. 1A. The results showed that the secondary battery had almost the same charge-discharge behavior as that of the Sample No. 1A.

Example 6

Examination was further conducted to ascertain the influence on the charge-discharge characteristics exerted by a difference in the shape of an expanded copper mesh.

A secondary battery was manufactured in the same manner as applied to the Example 4, except the use of an expanded copper mesh having a shape shown in FIG. 2D.

The charge-discharge behavior of the resultant secondary battery over the lapse of charge-discharge cycles was examined in the same manner as applied to the Sample No. 1A. The results showed that the secondary battery had almost the same charge-discharge behavior as that of the Sample No. 1A.

Example 7

Next, examination was conducted to ascertain the influence on the charge-discharge characteristics exerted by a difference in the kind of an insulating material used as the restrictor 8.

Secondary batteries were manufactured in the same manner as applied to the Examples 1 to 6, except that the restrictors 8 of the respective batteries were formed by using epoxy-based thermosetting resin, urethane acrylate-based thermosetting resin and $P_2O_5$—CuO—ZnO-based low-melting-point glass, instead of the ethylene-vinyl acetate copolymer-based hot-melt resin.

The restrictors 8 made of epoxy-based thermosetting resin, urethane acrylate-based thermosetting resin and $P_2O_5$—CuO—ZnO-based low-melting-point glass had an average thickness of about 110 μm, 150 μm and 130 μm, respectively.

The charge-discharge behavior of the resultant secondary batteries over the lapse of charge-discharge cycles was examined in the same manner as applied to the Sample No. 1A. The results showed that the respective secondary batteries had almost the same charge-discharge behavior as that of the corresponding secondary batteries of the Examples 1 to 6.

Lithium-Ion-Conducting Secondary Battery

In the following Examples, unless otherwise mentioned, secondary batteries were manufactured within a glove box kept in a dry argon atmosphere.

Example 8

Sample No. 8A

Invention

Step i): First, an electrode (cathode) mixture material was prepared by mixing lithium cobaltate (cathode active material) particles having an average particle size of 5 μm and lithium-ion-conducting glass (solid electrolyte) particles having an average particle size of 5 μm in a ratio of 7:3 by weight.

In this regard, sulfide-based lithium-ion-conducting glass composed of lithium sulfide ($Li_2S$), silicon sulfide ($SiS_2$) and lithium phosphate ($LiPO_4$) in a composition ratio of 0.63 $Li_2S$-0.36 $SiS_2$-0.01 $LiPO_4$ was used as the lithium-ion-conducting glass.

Step ii): Next, the electrode mixture material was placed on a release paper and leveled to have an average thickness of about 180 μm. An expanded copper mesh (having an average thickness of about 100 μm and a through-hole occupation percentage of 80% in a plan view) plated with nickel and formed into the shape as shown in FIG. 2B was disposed on the electrode mixture material.

The combination of electrode mixture material and expanded copper mesh was inserted between press-rolling rollers together with the release paper, whereby the electrode mixture material was filled in the through-holes of the expanded copper mesh to produce a cathode sheet.

The resultant cathode sheet had an average thickness of about 115 μm. This cathode sheet was cut into a size of 14 mm×14 mm and used as a cathode 3. The quantity of the electrode mixture material filled in the resultant cathode was 130 mg and the portion of the cathode that does not overlap the expanded copper mesh in a side view had an average thickness of about 20 μm.

Step iii): Next, an indium (anode active material) foil having an average thickness of 80 μm was arranged on an expanded copper mesh having the shape as shown in FIG. 2A. Just like the method of producing the cathode sheet, an anode sheet having an average thickness of 100 μm was produced through the use of press-rolling rollers. This anode sheet was cut into a size of 14 mm×14 mm and used as an anode.

Step iv): Next, a female mold having a rectangular hole of 15 mm×15 mm in size was prepared for use. In a state that a lower male mold is fitted to the rectangular hole of the female mold, the cathode was inserted into the rectangular hole. Then, about 110 mg of the lithium-ion-conducting glass (solid electrolyte) particles noted above was filled in the rectangular hole and a top surface of a layer formed of the lithium-ion-conducting glass particles was leveled.

Step v): Next, an upper male mold was inserted into the rectangular hole and press-formed at a pressure of 4 tons/cm² to join the cathode and the electrolyte layer together. Thereafter, the upper male mold was removed from the female mold.

Step vi): Next, the anode was inserted into the rectangular hole and overlaid on the electrolyte layer. Then, the upper male mold was inserted into the rectangular hole again and pressed at a pressure of 0.2 ton/cm² to join the cathode, the electrolyte layer and the anode together to thereby form a laminated body (battery element) 2. The electrolyte layer 5 of the thus obtained laminated body 2 had an average thickness of about 150 µm.

Step vii): Next, the laminated body was taken out from the female mold and copper foil lead plates were attached to the cathode and the anode by spot welding, thereby forming a cathode lead and an anode lead.

Step viii): Next, almost all of the laminated body was covered with ethylene-vinyl acetate copolymer-based hot-melt resin in the same manner as applied to the Sample No. 1A. Then, the thus covered laminated body was inserted into an aluminum-made rectangular battery container (having an external dimension of 20 mm×20 mm×7 mm and an internal dimension of 18 mm×18 mm×5 mm) filled with thermosetting epoxy resin in an uncured state.

Thereafter, the thermosetting epoxy resin filled in the battery container was heated and cured. Lead plates were then bonded to hermetic insulation terminals which were attached to an aluminum-made lid. The lid was fixed to the battery container by aluminum soldering to obtain the secondary battery as shown in FIG. 4.

In the present Example, it can be seen that the restrictor 8 consisted of three layers, i.e., a hot-melt resin layer, an epoxy resin layer and an aluminum layer. Further, the thus formed restrictor 8 had an average thickness of about 2.5 mm.

In order to examine the charge-discharge behavior of the resultant secondary battery by a charge-discharge cycle test, the battery was charged at the constant current density of 100 µA/cm² and the charge operation was stopped at the moment when the battery voltage reached 4.0 V and the electric current became equal to 30 µA. Then, the battery was discharged at the constant current density of 100 µA/cm².

Figure 10:
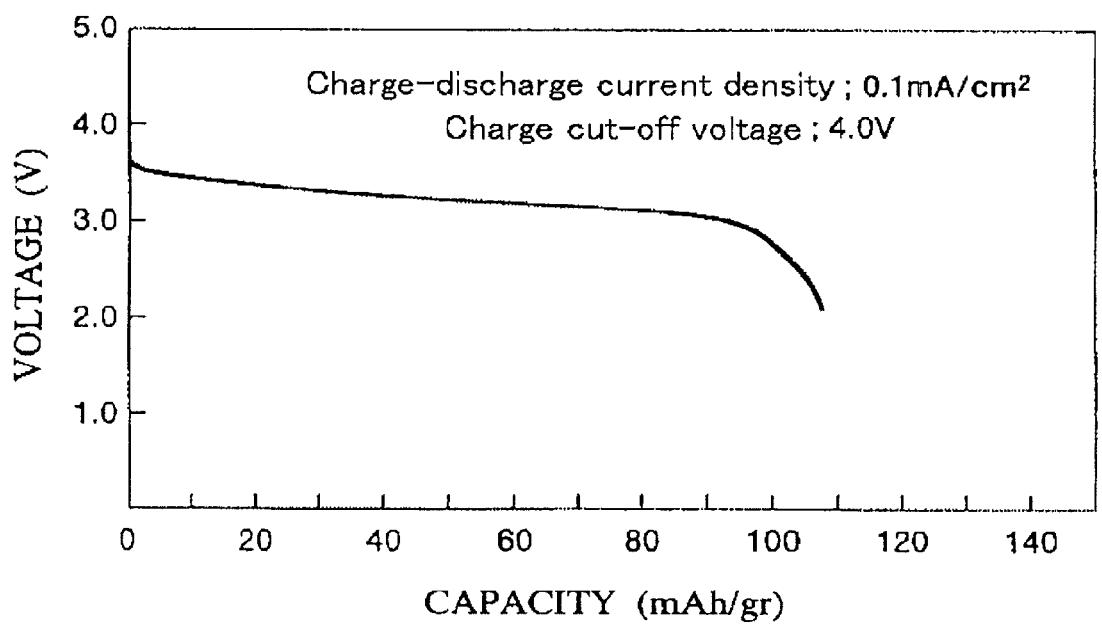
FIG. 10 is a graph showing the initial discharge behavior of the secondary battery of the Sample No. 8A (Invention).
Figure 11:
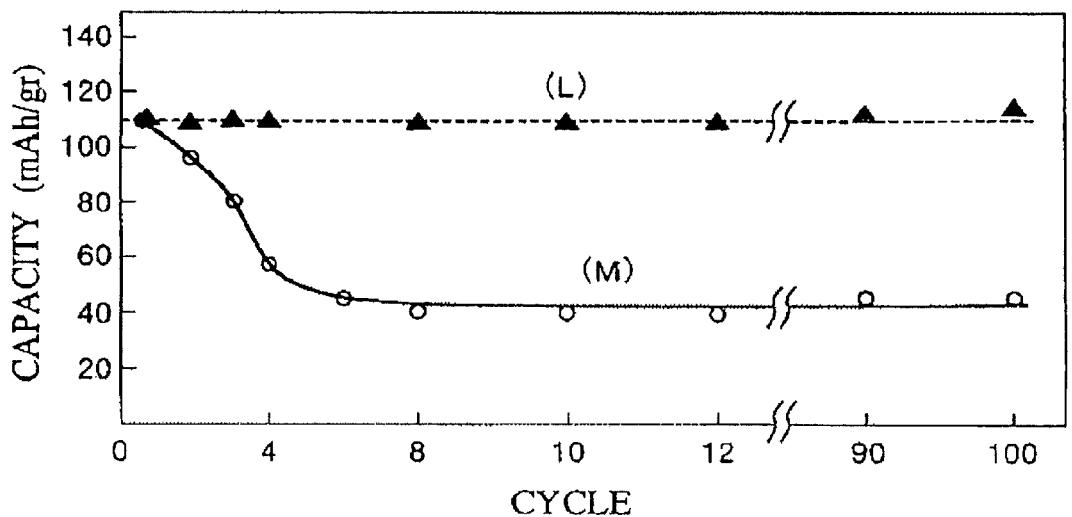
FIG. 11 is a graph showing the variation in discharge capacity over the lapse of charge-discharge cycles of the secondary battery of each of the Sample No. 8A (Invention) and the Sample No. 7B (Comparative Example).

The initial charge-discharge behavior of the battery is illustrated in FIG. 10 and the variation in discharge capacity over the lapse of charge-discharge cycles is shown as a curve (L) in FIG. 11.

As can be seen in FIGS. 10 and 11, the secondary battery provided a generally flat discharge curve when the discharge voltage was in the range of 3.0 to 3.5 V and the discharge capacity was hardly changed even after the lapse of one hundred charge-discharge cycles.

Sample No. 8B

Comparative Example

First, a cathode sheet and an anode sheet were produced in the same manner as applied to the Sample No. 8A. Using a blanking die, the cathode sheet and the anode sheet were formed into a cathode and an anode. Both of the cathode and the anode had a diameter of 14 mm and were of a disc shape.

Next, using a mold with a cylindrical hole of 15 mm in diameter, a laminated body (battery element) was produced in the same manner as applied to the Sample No. 8A.

Next, the laminated body was taken out from the mold and received in the coin battery container (CR1616-type) as shown in FIG. 16. A coin-type secondary battery was manufactured by pressing a sealing plate against the battery container.

The thus obtained secondary battery was subjected to a charge-discharge cycle test in the same manner as applied to the Sample No. 8A. The results of the charge-discharge cycle test are illustrated as a curve (M) in FIG. 11.

Referring to the curve (M) illustrated in FIG. 11, the discharge capacity relative to the initial charge capacity was about 110 mAh/gr. The discharge capacity was reduced, step by step, to about 100 mAh/gr at the second charge-discharge cycle, to about 80 mAh/gr at the third charge-discharge cycle and, finally, to about 40 mAh/gr at the sixth charge-discharge cycle. Thereafter, the discharge capacity was kept nearly unchanged.

As was apparent from the foregoing, the secondary battery of the Sample No. 8A (Invention) could suppress or prevent reduction in discharge capacity over the lapse of charge-discharge cycles, which is one of the advantageous effects provided by the battery structure of the invention.

Example 9

Next, examination was conducted to ascertain the influence on the charge-discharge characteristics exerted by a difference in the kind of an anode active material.

First, a cathode and an electrolyte layer were joined together in the same manner as applied to the Sample No. 8A. Then, aluminum particles (having an average particle size of 10 µm) was mixed with the same electrolyte particles as used in the Sample No. 8A in a ratio of 5:5 by weight and a binder was added to the mixture in a percentage of 2.5% by weight, thereby preparing an anode mixture material.

Next, the anode mixture material was placed on a release paper and leveled. An expanded copper mesh having the shape as shown in FIG. 2A was overlaid on the anode mixture material and an anode sheet (having an average thickness of 100 µm) was produced by use of the same press-rolling rollers as used in producing the cathode sheet. The anode sheet was cut into a size of 14 mm×14 mm to thereby form an anode.

Next, using the thus obtained anode, a laminated body was produced in the same manner as applied to the Sample No. 8A. A secondary battery was manufactured by using the laminated body. The pressure used in forming the laminated body was 4 tons/cm².

In order to examine the charge-discharge behavior of the resultant secondary battery by a charge-discharge cycle test, the battery was charged at the constant current density of 100 µA/cm². The charge operation was stopped at the moment when the battery voltage reached 4.0 V and the electric current became equal to 50 µA. Then, the battery was discharged at the constant current density of 100 µA/cm².

Figure 12:
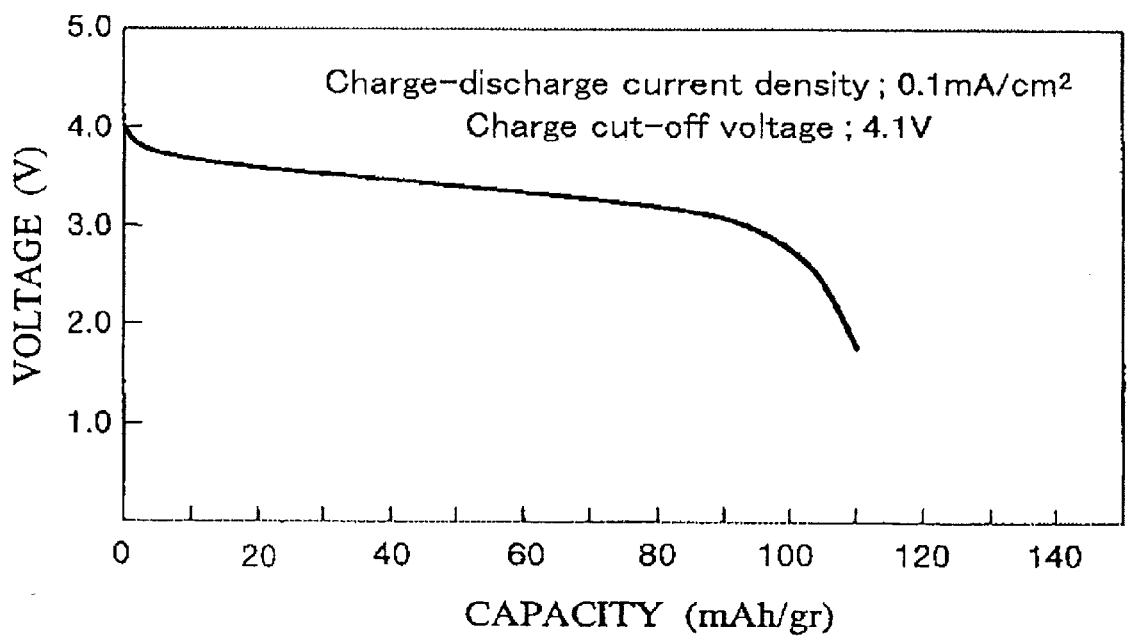
FIG. 12 is a graph showing the initial discharge behavior of the secondary battery of the Example 9.

The results showed that the initial charge-discharge behavior of the battery was not almost changed from that of the Sample No. 8A. As illustrated in FIG. 12, however, the battery discharge voltage changed with a curve about 150 mV higher than the discharge voltage curve obtained in respect of the Sample No. 8A.

As could be appreciated from the foregoing, the shape of the anode was changed substantially uniformly even if different kinds of anode active materials were used, i.e., even when different kinds of alloy were generated in the anode.

Example 10

Next, examination was conducted to ascertain the influence on the charge-discharge characteristics exerted by a difference in the kind of a cathode active material.

A secondary battery was manufactured in the same manner as applied to the Sample No. 8A, except that, in place of lithium cobaltate, lithium manganate ($LiMn_2O_4$) was used as the cathode active material. The filling quantity of an electrode mixture material was about 120 mg.

In order to examine the charge-discharge behavior of the resultant secondary battery by a charge-discharge cycle test, the battery was charged at the constant current density of 100 µA/cm². The charge operation was stopped at the moment when the battery voltage reached 4.0 V and the electric current became equal to 50 µA. Then, the battery was discharged at the constant current density of 100 µA/cm$^2$.

Figure 13:
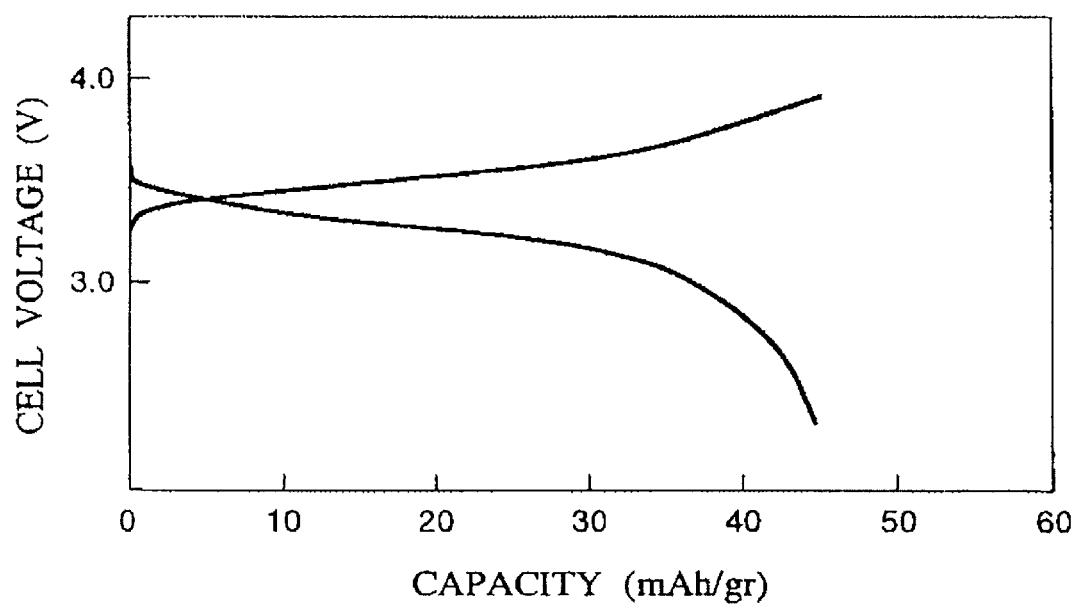
FIG. 13 is a graph showing the initial discharge behavior of the secondary battery of the Example 10.

As illustrated in FIG. 13, the battery discharge voltage changed with a curve about 100 mV lower than the discharge voltage curve obtained in respect of the Sample No. 8A and the discharge capacity was a low value of about 50 mAh/gr. However, the initial charge-discharge behavior of the battery was not almost changed from that of the Sample No. 8A.

Example 11

Next, examination was conducted to ascertain the influence on the charge-discharge characteristics exerted by a difference in the kind of a solid electrolyte.

A secondary battery was manufactured in the same manner as applied to the Sample No. 8A, except that thio-LISICON ($Li_{3.25}Ge_{0.25}P_{0.75}S_4$), one of crystalline lithium ion conductors, was used as the solid electrolyte in place of the sulfide-based lithium-ion-conducting glass and further except that an indium foil having an average thickness of 100 µm was used as the anode.

In order to examine the charge-discharge behavior of the resultant secondary battery by a charge-discharge cycle test, the battery was charged at the constant current density of 100 µA/cm$^2$. The charge operation was stopped at the moment when the battery voltage reached 4.0 V and the electric current became equal to 10 µA. Then, the battery was discharged at the constant current density of 100 µA/cm$^2$.

The results showed that the initial charge-discharge behavior of the battery was not almost changed from that of the Sample No. 8A and no reduction was observed in the discharge capacity over the lapse of charge-discharge cycles. This means that the secondary battery provides the advantageous effects of the invention.

Example 12

Examination was further conducted to ascertain the influence on the charge-discharge characteristics exerted by a difference in the kind of a solid electrolyte.

A secondary battery was manufactured in the same manner as applied to the Sample No. 8A, except that amorphous sulfide-based lithium ion conductor (solid electrolyte) particles made of 0.3 $P_2S_5$-0.7 $Li_2S$ were used as the solid electrolyte in place of the sulfide-based lithium-ion-conducting glass.

The charge-discharge behavior of the resultant secondary battery over the lapse of charge-discharge cycles was examined in the same manner as applied to the Sample No. 8A. The results showed that the secondary battery had substantially the same charge-discharge behavior as that of the Sample No. 8A.

Example 13

Next, examination was conducted to ascertain the influence on the charge-discharge characteristics exerted by a difference in the shape of an expanded copper mesh.

A secondary battery was manufactured in the same manner as applied to the Sample No. 8A, except that an expanded copper mesh having the shape as shown in FIG. 2C was used in forming a cathode in Step ii) of the Sample No. 8A.

The charge-discharge behavior of the resultant secondary battery over the lapse of charge-discharge cycles was examined in the same manner as applied to the Sample No. 8A. The results showed that the secondary battery had substantially the same charge-discharge behavior as that of the Sample No. 8A.

Example 14

Examination was further conducted to ascertain the influence on the charge-discharge characteristics exerted by a difference in the shape of an expanded copper mesh.

A secondary battery was manufactured in the same manner as applied to the Sample No. 8A, except that an expanded copper mesh having the shape as shown in FIG. 2D was used in forming a cathode in Step ii) of the Sample No. 8A.

The charge-discharge behavior of the resultant secondary battery over the lapse of charge-discharge cycles was examined in the same manner as applied to the Sample No. 8A. The results showed that the secondary battery had substantially the same charge-discharge behavior as that of the Sample No. 8A.

Example 15

Next, examination was conducted to ascertain the influence on the charge-discharge characteristics exerted by a difference in the kind of an insulating material used in forming the restrictor 8.

Secondary batteries were manufactured in the same manner as applied to the Examples 8 to 14, except that the laminated body was covered with phenol-based thermosetting resin, urethane acrylate-based photocurable resin or $P_2O_5$—CuO—ZnO-based low-melting-point glass, instead of the ethylene-vinyl acetate copolymer-based hot-melt resin.

The charge-discharge behavior of the resultant secondary battery over the lapse of charge-discharge cycles was examined in the same manner as applied to the Sample No. 8A. The results showed that the respective secondary batteries had the same charge-discharge behavior as that of the corresponding batteries of the Examples 8 to 14.

Further, in the same manner as applied to the Sample Nos. 1A and 8A, an attempt was made to manufacture a secondary battery by using a sintered body as the solid electrolyte. Another attempt was made to produce a secondary battery by using pulverized particles of the sintered body as the solid electrolyte. Due to the fact that the sintered body was stiff and brittle and exhibited poor moldability, it was impossible to manufacture a secondary battery from the sintered body. Thus, the results offered by the Sample Nos. 1A and 8A were not attainable in these attempts.

As described hereinabove, with the secondary battery (all-solid secondary battery) of the invention, use of the restrictor makes it possible to restrict expansion of the cathode 3 and the anode 4 in the plane direction thereof and the resultant expansion of the electrolyte layer 5 in the plane direction thereof.

As a result, for example, it is possible to prevent the breakage of the electronic bond between particles (or grains) of the electrode active material or the disconnection of the ion-conducting path between the electrode active material and the electrolyte in the electrodes (the cathode 3 and the anode 4).

Further, it is also possible to prevent the disconnection (disjunction) of the ion-conducting path between the electrodes and the electrolyte layer 5 or between the electrolyte particles 51 in the electrolyte layer 5. This helps to prevent the discharge capacity from being reduced over the lapse of charge-discharge cycles.

Furthermore, in the respective Examples set forth above, use of the expanded mesh (conductive member) arranged within each electrode makes it possible to prevent or suppress expansion of the electrodes and also to keep the current density within the electrodes uniform (to reduce uneven distribution of the electric current). It is supposed that this improves the characteristics of the secondary battery to a great extent.

As can be noted from the results of the Examples 2 and 3, even if the expanded mesh is not arranged within each electrode, according to the invention, it is possible to obtain a secondary battery having improved characteristics by forming an electrode material layer of 120 μm or less (preferably, 80 μm or less) in average thickness on the surface of a conductive plate and using the same as an electrode.

As set forth above, the invention clarifies the cause of interim reduction in discharge capacity over the lapse of charge-discharge cycles that does matter in the conventional secondary battery (all-solid secondary battery) using electrolyte particles. By proposing a configuration (battery configuration) that can eliminate the cause of capacity reduction, the invention is capable of preventing reduction in battery discharge capacity over the lapse of charge-discharge cycles.

Thus, the invention provides a technology that assists in improving safety and reliability of a secondary battery, the advent of which has been requested in the general market.

What is claimed is:

1. A secondary battery, comprising:
    a laminated body having a pair of electrodes and an electrolyte layer provided between the pair of electrodes, the electrolyte layer including electrolyte particles, the laminated body having an end portion; and
    a restrictor provided so as to cover at least the end portion of the laminated body for restricting expansion of the electrolyte layer in the plane direction thereof,
    wherein the restrictor is comprised of a plurality of layers respectively formed of different materials.

2. The secondary battery as claimed in claim 1, wherein the laminated body has conductive portions respectively connected to the respective electrodes, and the restrictor is provided so as to cover almost all of the laminated body excepting the conductive portions.

3. The secondary battery as claimed in claim 1, wherein the plurality of layers of the restrictor are made of an insulating material.

4. The secondary battery as claimed in claim 3, wherein the insulating material is one of thermoplastic resin, thermosetting resin, photocurable resin and low-melting-point glass or a combination of two or more of them.

5. The secondary battery as claimed in claim 1, wherein at least one of the pair of electrodes has a base member having a plurality of filling portions, and at least the filling portions of the base member is filled with an electrode material.

6. The secondary battery as claimed in claim 5, wherein the base member is provided for preventing or suppressing expansion of the electrode in the plane direction thereof.

7. The secondary battery as claimed in claim 5, wherein the base member has a surface thereof, and at least the surface has conductivity for making the current density in the electrode uniform.

8. The secondary battery as claimed in claim 5, wherein the base member includes a mesh member having through-holes which serve as the filling portions.

9. The secondary battery as claimed in claim 8, wherein the mesh member has an outer circumferential portion, and the base member further includes a reinforcing portion which extends along the outer circumferential portion of the mesh member for reinforcing the mesh member.

10. The secondary battery as claimed in claim 8, wherein the base member further includes a reinforcing plate which is provided on the opposite side of the mesh member from the electrolyte layer for reinforcing the mesh member.

11. The secondary battery as claimed in claim 5, wherein the at least one of the pair of electrodes has an electrode material layer made of the electrode material, and the electrode material layer lies on the side of the electrolyte layer so as to have an average thickness of 120 μm or less when viewed from the side thereof.

12. The secondary battery as claimed in claim 5, wherein the electrode material contains an electrode active material and a solid electrolyte material.

13. The secondary battery as claimed in claim 1, wherein the electrolyte particles are composed of a silver ion conductor or a lithium ion conductor.

14. The secondary battery as claimed in claim 13, wherein the lithium ion conductor is a sulfide-based lithium ion conductor.

15. The secondary battery as claimed in claim 13, wherein the lithium ion conductor contains at least one of a crystalline lithium ion conductor and an amorphous lithium ion conductor.

* * * * *